US008655794B1

(12) United States Patent
Cobb et al.

(10) Patent No.: US 8,655,794 B1
(45) Date of Patent: Feb. 18, 2014

(54) SYSTEMS AND METHODS FOR CANDIDATE ASSESSMENT

(71) Applicant: Cobb Systems Group, LLC, Rockville, MD (US)

(72) Inventors: Wayne Cobb, Potomac, MD (US); Christine Juettner, Gaithersburg, MD (US); Karunakar Neriyanuru, Bangalore (IN); Stephen Ray, North Potomac, MD (US)

(73) Assignee: Cobb Systems Group, LLC, Rockville, MD (US)

( * ) Notice: Subject to any disclaimer, the term of this patent is extended or adjusted under 35 U.S.C. 154(b) by 0 days.

(21) Appl. No.: 13/792,174

(22) Filed: Mar. 10, 2013

Related U.S. Application Data

(60) Provisional application No. 61/609,303, filed on Mar. 10, 2012.

(51) Int. Cl.
*G06Q 10/00* (2012.01)

(52) U.S. Cl.
USPC .............................. 705/321; 705/1.1; 705/328

(58) Field of Classification Search
USPC .............................. 705/1, 320, 321, 1.1, 328
See application file for complete search history.

(56) References Cited

U.S. PATENT DOCUMENTS

2005/0181339 A1* 8/2005 Hewson ........................ 434/236
2006/0080356 A1* 4/2006 Burges et al. ............. 707/103 R
2008/0059290 A1* 3/2008 McFaul ........................... 705/11

OTHER PUBLICATIONS

MGMA 2009 Cost Survey Reports show decline in medical revenue; Oct. 5, 2009 (retrieved at: http://www.mgma.com/blog/MGMA-2009-Cost-Survey-Reports-show-decline-in-medical-revenue/.)*
Graves, Laura M; Karren, Ronald J. ("Interviewer Decision Processes and Effectiveness: An Experimental Policy-Capturing Investigation". Personnel Psychology 45.2 (Summer 1992): 313.).*
Campbell, Melissa. ("Putting Alaskans With Disabilities to Work". Alaska Business Monthly 18.10 (Oct. 1, 2002): 70.).*
Iwata, Edward; Jeff Rowe.("In moving toward diversity, companies find hiring a rainbow work force is only the beginning. All Together Now: [Morning Edition]". The Orange County Register. Orange County Register [Santa Ana, Calif] Sep. 5, 1993: k01.).*
Foster, S Thomas, Jr; Gallup, Lyman. ("On functional differences and quality understanding". Benchmarking 9.1 (2002): 86-102.).*

* cited by examiner

*Primary Examiner* — Gabrielle McCormick
(74) *Attorney, Agent, or Firm* — CipherLaw

(57) ABSTRACT

Systems and methods for assessing the qualifications of a candidate for a position using metrics recorded, assessed, and analyzed by an automated and computerized system are provided. The systems and methods can provision a candidate assessment workspace for receiving a candidate solution and then calculate a candidate digital signature based on the candidate solution.

20 Claims, 63 Drawing Sheets

FIG. 5

| Component | Type | Description |
| --- | --- | --- |
| **Candidate Assessment Template Manager** | Application Component | Manages the repository of candidate assessment templates used to generate candidate assessment packages. |
| **Candidate Assessor** | Actor | Individual responsible for providing the context for an assessment (e.g., the skill level of candidates, the set of competencies to assess, etc.). |
| **Candidate Assessment Package Generator** | Application Component | Generates candidate assessment packages by merging an assessment context, supplied by a candidate assessor, with candidate assessment templates. |
| **Candidate Assessment Provisioner** | Application Component | Provisions the computing environment a candidate uses to undertake an assessment |
| **Candidate** | Actor | An individual undergoing an assessment |
| **Candidate Assessment Repository** | Information Component | The repository of candidate assessments performed by CAS |
| **Candidate Submission Analyzer** | Application Component | The component that analyzes candidate submissions |

FIG. 6

| Dimension | Description | Examples |
|---|---|---|
| **Problem Domain** | The business area to which a template is applicable | Financial Services, Gaming, Manufacturing, Telecommunications |
| **Discipline** | The competency area an assessment instantiated from a template assesses | Software Development, Project Management, Quality Assurance |
| **Problem Type** | A category of problem a candidate is asked to solve during an assessment | Software Development: Event/Response, Algorithm Design<br>Project Management: Fixed Cost, Time and Materials<br>Quality Assurance: Black box Testing, White box Testing, Performance Testing, Security Testing |

Class Diagram of Interpreter Pattern

FIG. 16

STORY: HIT A BRICK WITH A BULLET

An example user story is presented below:

As a Game Player
I want to destroy Bricks by hitting then with Bullets
So that I can complete a Round of the game Scenario 1: A bullet hits a fixed brick
When a bullet hits a fixed brick
Then the brick is unaffected Scenario 2: A bullet hits an undamaged brick
When a bullet hits an undamaged brick
Then the brick becomes partially damaged Scenario 3: A bullet hits a partially damaged brick
When a bullet hits a partially damaged brick
Then the brick becomes badly damaged Scenario 4: A bullet hits a badly damaged brick
When a Bullet hits a badly damaged brick
Then the brick should be destroyed Instructions to User:

Implement this user story by completing the BrickBreakEventsImpl.OnBrickHit function.
The three arguments of this function are:

1. The unique identifier of the brick that was hit
2. The current state of the brick that was hit
3. Whether the bullet was at normal or bomb strength when it hit the brick (this can be ignored for this user story)

The return value of OnBrickHit is an instance of BrickBreakCommands. Use the BrickBreakCommands .AddUpdateBrickCmd to add a command to update the state of the brick that was hit.

BrickBreak.RunScenario is called once passing “1” as the scenario id.

FIG. 17

Example Domain Grammar Files: BrickBreaker Scenario 1

```xml
<?xml version="1.0" encoding="UTF-8"?>

<game-scenario>
    <score-card type="BBGameInfo">
           <property type="int" name="score">0</property>
           <property type= "BulletPower"
name="bulletPower">Rocket</property>
           <property type="int" name="bulletCount">1</property>
    </score-card>

    <game-piece type="Brick" id="101" desc="Brick 1">
        <property name="status"
type="BrickStatus">Undamaged</property>
    </game-piece>
    <game-piece type="Brick" id="102" desc="Brick 2">
        <property name="status"
type="BrickStatus">Undamaged</property>
    </game-piece>

    <play-area dimension="2">
        <location game-piece-ref="101" x="1" y="1"/>
        <location game-piece-ref="102" x="2" y="2"/>
    </play-area>

    <event id="1001" type="BrickHit">
        <property-ref id="102" type="Brick" name="targetBrick"/>
    </event>
    <event id="1002" type="BrickHitWithTwinLaserBeam">
        <property-ref id="101" type="Brick" name="targetBrick"/>
    </event>
</game-scenario>
```

FIG. 18A

Example Domain Grammar Files: Rebalancing Fund Scenario 1

```
<?xml version="1.0" encoding="UTF-8"?>

<game-scenario>
    <score-card type="Score">
          <property type="int" name="score">0</property>
    </score-card>

    <game-piece type="FundAmount" id="901">
        <property name="amount" type="int">1000</property>
    </game-piece>
    <game-piece type="FundAmount" id="902">
        <property name="amount" type="int">1300</property>
    </game-piece>
    <game-piece type="FundAmount" id="903">
        <property name="amount" type="int">1200</property>
    </game-piece>
    <game-piece type="FundAmount" id="904">
        <property name="amount" type="int">700</property>
    </game-piece>
    <game-piece type="FundAmount" id="905">
        <property name="amount" type="int">800</property>
    </game-piece>
    <game-piece type="FundAmount" id="906">
        <property name="amount" type="int">500</property>
    </game-piece>
    <game-piece type="FundAmount" id="907">
        <property name="amount" type="int">1000</property>
    </game-piece>
    <game-piece type="FundAmount" id="908">
        <property name="amount" type="int">1600</property>
    </game-piece>
    <game-piece type="FundAmount" id="909">
        <property name="amount" type="int">1000</property>
    </game-piece>
    <game-piece type="FundAmount" id="910">
        <property name="amount" type="int">900</property>
    </game-piece>
    <game-piece type="Fund" id="101" desc="Fund 1">
        <property name="classification" type="text">A</property>
        <property name="lastPurchaseDate" type="int">300</property>
        <property name="firstPurchaseDate" type="int">500</property>
        <property-ref id="901" name="balance" type="FundAmount"/>
        <property-ref id="902" name="target" type="FundAmount"/>
    </game-piece>
    <game-piece type="Fund" id="102" desc="Fund 2">
        <property name="classification" type="text">A</property>
```

FIG. 18B

```
        <property name="lastPurchaseDate" type="int">300</property>
        <property name="firstPurchaseDate" type="int">500</property>
        <property-ref id="903" name="balance" type="FundAmount"/>
        <property-ref id="904" name="target" type="FundAmount"/>
    </game-piece>
    <game-piece type="Fund" id="103" desc="Fund 3">
        <property name="classification" type="text">A</property>
        <property name="lastPurchaseDate" type="int">300</property>
        <property name="firstPurchaseDate" type="int">500</property>
        <property-ref id="905" name="balance" type="FundAmount"/>
        <property-ref id="906" name="target" type="FundAmount"/>
    </game-piece>
    <game-piece type="Fund" id="104" desc="Fund 4">
        <property name="classification" type="text">A</property>
        <property name="lastPurchaseDate" type="int">300</property>
        <property name="firstPurchaseDate" type="int">500</property>
        <property-ref id="907" name="balance" type="FundAmount"/>
        <property-ref id="908" name="target" type="FundAmount"/>
    </game-piece>
    <game-piece type="Fund" id="105" desc="Fund 5">
        <property name="classification" type="text">A</property>
        <property name="lastPurchaseDate" type="int">300</property>
        <property name="firstPurchaseDate" type="int">500</property>
        <property-ref id="909" name="balance" type="FundAmount"/>
        <property-ref id="910" name="target" type="FundAmount"/>
    </game-piece>
    <game-piece type="MoneyMarket" id="106" desc="Money market
bucket">
        <property name="balance" type="int">10000</property>
    </game-piece>
    <game-piece type="Advisor" id="107" desc="Advisor">
        <property name="approval" type="boolean">false</property>
    </game-piece>
    <game-piece type="Account" id="108" desc="Account">
        <property-ref type="Fund" id="101" name="fund1"/>
        <property-ref type="Fund" id="102" name="fund2"/>
        <property-ref type="Fund" id="103" name="fund3"/>
        <property-ref type="Fund" id="104" name="fund4"/>
        <property-ref type="Fund" id="105" name="fund5"/>
        <property-ref type="MoneyMarket" id="106" name="moneyMarket"/>
        <property-ref type="Advisor" id="107" name="advisor"/>
    </game-piece>

    <play-area dimension="1">
        <location game-piece-ref="101" x="1"/>
        <location game-piece-ref="102" x="1"/>
        <location game-piece-ref="103" x="1"/>
        <location game-piece-ref="104" x="1"/>
```

FIG. 18C

```
        <location game-piece-ref="105" x="1"/>
        <location game-piece-ref="106" x="4"/>
        <location game-piece-ref="107" x="5"/>
        <location game-piece-ref="108" x="6"/>
    </play-area>

    <event id="1001" type="SandPMoves">
        <property type="int" name="value">3625</property>
        <property-ref type="Account" name="account" id="108"/>
        <property type="int" name="today">23</property>
    </event>
</game-scenario>
```

FIG. 19

Example Domain Grammar Files: Asteroids Scenario 1

```
<?xml version="1.0" encoding="UTF-8"?>

<game-scenario>
    <score-card type="Score">
           <property type="int" name="score">0</property>
    </score-card>

    <game-piece type="BigRock" id="101" desc="BigRock 1">
    </game-piece>
    <game-piece type="BigRock" id="102" desc="BigRock 2">
    </game-piece>
    <game-piece type="LittleRock" id="103" desc="LittleRock 1">
    </game-piece>
    <game-piece type="LittleRock" id="104" desc="LittleRock 2">
    </game-piece>
    <game-piece type="LittleRock" id="105" desc="LittleRock 3">
    </game-piece>
    <game-piece type="Ship" id="106" desc="Ship 1">
    </game-piece>

    <play-area dimension="2">
        <location game-piece-ref="101" x="1" y="1"/>
        <location game-piece-ref="102" x="1" y="2"/>
        <location game-piece-ref="103" x="2" y="1"/>
        <location game-piece-ref="104" x="2" y="2"/>
        <location game-piece-ref="105" x="3" y="1"/>
        <location game-piece-ref="106" x="3" y="2"/>
    </play-area>

    <event id="1001" type="BulletHitsBigRock">
        <property-ref id="101" type="BigRock" name="target"/>
    </event>
    <event id="1002" type="BulletHitsLittleRock">
        <property-ref id="103" type="LittleRock" name="target"/>
    </event>
    <event id="1003" type="BigRockHitsBigRock">
        <property-ref id="101" type="BigRock" name="source"/>
        <property-ref id="102" type="BigRock" name="target"/>
    </event>
    <event id="1004" type="LittleRockHitsShip">
        <property-ref id="103" type="LittleRock" name="source"/>
        <property-ref id="106" type="Ship" name="target"/>
    </event>
</game-scenario>
```

FIG. 20

Example Domain Grammar Files: Asteroids Scenario 2

```xml
<?xml version="1.0" encoding="UTF-8"?>

<game-scenario>
    <score-card type="Score">
           <property type="int" name="score">0</property>
    </score-card>

    <game-piece type="BigRock" id="101" desc="BigRock 1">
    </game-piece>
    <game-piece type="BigRock" id="102" desc="BigRock 2">
    </game-piece>
    <game-piece type="BigRock" id="103" desc="BigRock 3">
    </game-piece>
    <game-piece type="BigRock" id="104" desc="BigRock 4">
    </game-piece>
    <game-piece type="LittleRock" id="105" desc="LittleRock 1">
    </game-piece>
    <game-piece type="Ship" id="106" desc="Ship 1">
    </game-piece>

    <play-area dimension="2">
        <location game-piece-ref="101" x="7" y="2"/>
        <location game-piece-ref="102" x="7" y="4"/>
        <location game-piece-ref="103" x="3" y="5"/>
        <location game-piece-ref="104" x="4" y="3"/>
        <location game-piece-ref="105" x="8" y="5"/>
        <location game-piece-ref="106" x="5" y="4"/>
    </play-area>

    <event id="1001" type="BigRockMoves">
        <property-ref id="101" type="BigRock" name="target"/>
        <property name="x" type="int">7</property>
        <property name="y" type="int">5</property>
    </event>
    <event id="1002" type="BulletHitsBigRock">
        <property-ref id="101" type="BigRock" name="target"/>
    </event>
</game-scenario>
```

FIG. 21A

Example Domain Grammar Files: Alien Game Scenario 1

```xml
<?xml version="1.0" encoding="UTF-8"?>

<game-scenario>
    <score-card type="Score">
           <property type="int" name="score">0</property>
    </score-card>

    <game-piece type="Alien" id="101" desc="Alien 1">
        <property name="health" type="AlienStatus">Live</property>
        <property name="worth" type="int">10</property>
    </game-piece>
    <game-piece type="Alien" id="102" desc="Alien 2">
        <property name="health" type="AlienStatus">Live</property>
        <property name="worth" type="int">12</property>
    </game-piece>
    <game-piece type="Alien" id="103" desc="Alien 3">
        <property name="health" type="AlienStatus">Live</property>
        <property name="worth" type="int">25</property>
    </game-piece>
    <game-piece type="Alien" id="104" desc="Alien 4">
        <property name="health" type="AlienStatus">Live</property>
        <property name="worth" type="int">0</property>
    </game-piece>
    <game-piece type="Alien" id="105" desc="Alien 5">
        <property name="health" type="AlienStatus">Live</property>
        <property name="worth" type="int">15</property>
    </game-piece>
    <game-piece type="Alien" id="106" desc="Alien 6">
        <property name="health" type="AlienStatus">Live</property>
        <property name="worth" type="int">7</property>
    </game-piece>
    <game-piece type="Ship" id="107" desc="Ship 1">
        <property name="status" type="ShipStatus">Active</property>
    </game-piece>

    <play-area dimension="2">
        <location game-piece-ref="101" x="1" y="1"/>
        <location game-piece-ref="102" x="1" y="2"/>
        <location game-piece-ref="103" x="2" y="1"/>
        <location game-piece-ref="104" x="2" y="2"/>
        <location game-piece-ref="105" x="3" y="1"/>
        <location game-piece-ref="106" x="3" y="2"/>
        <location game-piece-ref="107" x="15" y="15"/>
    </play-area>

    <event id="1001" type="RocketHit">
        <property-ref id="102" type="Alien" name="targetAlien"/>
        <property-ref id="107" type="Ship" name="sourceShip"/>
```

FIG. 21B

```
    </event>
    <event id="1001" type="RocketHit">
        <property-ref id="102" type="Alien" name="targetAlien"/>
        <property-ref id="107" type="Ship" name="sourceShip"/>
    </event>
    <event id="1002" type="ObjectHitShip">
        <property-ref id="101" type="Alien" name="source"/>
        <property-ref id="107" type="Ship" name="target"/>
    </event>
    <event id="1001" type="RocketHit">
        <property-ref id="103" type="Alien" name="targetAlien"/>
        <property-ref id="107" type="Ship" name="sourceShip"/>
    </event>
    <event id="1002" type="ObjectHitShip">
        <property-ref id="105" type="Alien" name="source"/>
        <property-ref id="107" type="Ship" name="target"/>
    </event>
    <event id="1001" type="RocketHit">
        <property-ref id="104" type="Alien" name="targetAlien"/>
        <property-ref id="107" type="Ship" name="sourceShip"/>
    </event>
    <event id="1002" type="ObjectHitShip">
        <property-ref id="106" type="Alien" name="source"/>
        <property-ref id="107" type="Ship" name="target"/>
    </event>
</game-scenario>
```

FIG. 22A

Example Domain Grammar Files: BrickBreaker Schema

```
<?xml version="1.0" encoding="UTF-8"?>

<game-schema name="BrickBreakGame" play-area-name="gameBoard" play-
area-dimension="2">
      <enum name="BrickStatus">
            <enum-list-value>Fixed</enum-list-value>
            <enum-list-value>Undamaged</enum-list-value>
            <enum-list-value>PartiallyDamaged</enum-list-value>
            <enum-list-value>Damaged</enum-list-value>
            <enum-list-value>Disappeared</enum-list-value>
      </enum>
      <enum name="BulletPower">
            <enum-list-value>Normal</enum-list-value>
            <enum-list-value>Rocket</enum-list-value>
      </enum>

      <score-card type="BBGameInfo" name="scoreCard">
            <property name="score" type="int" init-value="0"/>
            <property name="bulletPower" type="BulletPower" init-
value="BulletPower.Normal"/>
            <property name="bulletCount" type="int" init-value="1"/>
      </score-card>

     <game-piece type="Brick" name="brick">
         <property name="status" type="BrickStatus" init-
value="BrickStatus.Fixed"/>
     </game-piece>
      <game-piece type="BonusFeature" name="bonusFeature">
            <property name="length" type="int" init-value="4"/>
      </game-piece>
      <game-piece type="Paddle" name="paddle">
            <property name="length" type="int" init-value="4"/>
      </game-piece>

     <events>
            <event name="BrickHit">
                  <property name="targetBrick" type="Brick"/>
            </event>
            <event name="BrickHitWithTwinLaserBeam">
                  <property name="targetBrick" type="Brick"/>
            </event>
            <event name="CatchBonusFeature"/>
      </events>
      <rules>
            <rule name="onBrickHit" id="12" event-type="BrickHit"
event-ref="event">
             <if>
                 <eq>
```

FIG. 22B

```
                    <value>scoreCard.bulletPower</value>
                    <value>BulletPower.Rocket</value>
                </eq>
                <then>
                    <set ref="event.targetBrick.status">
                        <enum-value
increment="2">event.targetBrick.status</enum-value>
                    </set>
                    <set ref="scoreCard.score">
                        <add>
                            <value>scoreCard.score</value>
                            <value>5</value>
                        </add>
                    </set>
                    <set ref="scoreCard.bulletPower">
                        <enum-value>BulletPower.Normal</enum-value>
                    </set>
                </then>
                <else>
                    <set ref="event.targetBrick.status">
                        <enum-value
increment="1">event.targetBrick.status</enum-value>
                    </set>
                    <set ref="scoreCard.score">
                        <add>
                            <value>scoreCard.score</value>
                            <value>2</value>
                        </add>
                    </set>
                </else>
            </if>
           </rule>
           <rule name="onBrickHitWithTwinLaserBeam" id="13" event-
type="BrickHitWithTwinLaserBeam" event-ref="event">
            <set  ref="scoreCard.score">
                <add>
                    <value>scoreCard.score</value>
                    <value>4</value>
                </add>
            </set>
            <set ref="event.targetBrick.status">
                <enum-value>BrickStatus.Disappeared</enum-value>
            </set>
            <for-each item-type="Brick" item-ref="item"
list="event.targetBrick.neighbors" arg="1">
                <set ref="item.status">
                    <enum-value>BrickStatus.Damaged</enum-value>
                </set>
            </for-each>
```

FIG. 22C

```
            <for-each item-type="Brick" item-ref="item"
list="event.targetBrick.neighbors">
                <set ref="item.status">
                    <enum-value>BrickStatus.Undamaged</enum-value>
                </set>
            </for-each>
           </rule>
           <rule name="onCatchBonusFeature" id="14" event-
type="CatchBonusFeature" event-ref="event">
            <set ref="scoreCard.bulletPower">
                <enum-value>BulletPower.Rocket</enum-value>
            </set>
           </rule>
      </rules>
</game-schema>
```

FIG. 23A

Example Domain Grammar Files: Rebalance Funds Schema

```
<?xml version="1.0" encoding="UTF-8"?>

<game-schema name="RebalanceFunds" play-area-name="gameBoard" play-
area-dimension="1">
      <score-card type="Score" name="score">
            <property name="score" type="int" init-value="0"/>
      </score-card>

    <game-piece type="MoneyMarket" name="money market">
            <property name="balance" type="int" init-value="0"/>
    </game-piece>
    <game-piece type="Advisor" name="investmentAdvisor">
            <property name="approval" type="boolean" init-
value="true"/>
    </game-piece>
    <game-piece type="Account" name="account">
            <property name="moneyMarket" type="MoneyMarket"/>
            <property name="fund1" type="Fund"/>
            <property name="fund2" type="Fund"/>
            <property name="fund3" type="Fund"/>
            <property name="fund4" type="Fund"/>
            <property name="fund5" type="Fund"/>
            <property name="advisor" type="Advisor"/>
    </game-piece>

    <exchangeable name="FundAmount">
        <property name="amount" type="int"/>
        <acceptable>
            <gt>
                <value>amount</value>
                <value>0</value>
            </gt>
        </acceptable>
        <difference ref="other">
            <subtract>
                <value>amount</value>
                <value>other.amount</value>
            </subtract>
        </difference>
        <increase ref="other">
            <set ref="amount">
                <add>
                    <value>amount</value>
                    <value>other.amount</value>
                </add>
            </set>
        </increase>
        <decrease ref="other">
```

FIG. 23B

```
            <set ref="amount">
                <subtract>
                    <value>amount</value>
                    <value>other.amount</value>
                </subtract>
            </set>
        </decrease>
        <compare ref="other" type="FundAmount" result="result">
            <if>
                <gt>
                    <value>amount</value>
                    <value>other.amount</value>
                </gt>
                <then>
                    <assign ref="result">
                        <value>1</value>
                    </assign>
                </then>
                <else>
                    <if>
                        <eq>
                            <value>amount</value>
                            <value>other.amount</value>
                        </eq>
                        <then>
                            <assign ref="result">
                                <value>0</value>
                            </assign>
                        </then>
                        <else>
                            <assign ref="result">
                                <value>-1</value>
                            </assign>
                        </else>
                    </if>
                </else>
            </if>
        </compare>
    </exchangeable>

    <balanceable name="Fund" keyType="String"
exchangeableType="FundAmount">
        <property name="classification" type="text"/>
        <property name="lastPurchaseDate" type="int"/>
        <property name="firstPurchaseDate" type="int"/>

        <key>classification</key>
        <ready-to-give>
            <gt>
                <subtract>
```

FIG. 23C

```
                    <value>lastPurchaseDate</value>
                    <built-in>today</built-in>
                </subtract>
                <value>30</value>
            </gt>
        </ready-to-give>

        <acceptable-others>
            <value>"A"</value>
            <value>"B"</value>
        </acceptable-others>
    </balanceable>

    <events>
           <event name="SandPMoves">
                 <property name="value" type="int"/>
                 <property name="account" type="Account"/>
                 <property name="today" type="int"/>
           </event>
      </events>

    <rules>
           <rule name="RuleOne" id="1011" event-type="SandPMoves"
event-ref="event">
            <balancer name="fundBalancer">
                <key>text</key>
                <exchangeable>FundAmount</exchangeable>
                <balanceable>Fund</balanceable>
            </balancer>

            <for-each item-ref="fund" item-type="Fund"
list="event.account.fund1.neighbors" >
                <set ref="fund.balancer">
                    <value>fundBalancer</value>
                </set>
            </for-each>

            <balance name="fundBalancer"/>
           </rule>
      </rules>
</game-schema>
```

FIG. 24A

Example Domain Grammar Files: Simple Asteroid Schema

```
<?xml version="1.0" encoding="UTF-8"?>

<game-schema name="SimpleAsteriod" play-area-name="gameBoard" play-
area-dimension="2">
     <score-card type="Score" name="score">
          <property name="score" type="int" init-value="0"/>
     </score-card>

    <game-piece type="BigRock" name="alien">
          <property name="score" type="int" init-value="100"/>
    </game-piece>
    <game-piece type="LittleRock" name="alien">
          <property name="score" type="int" init-value="50"/>
    </game-piece>
     <game-piece type="Ship" name="ship">
     </game-piece>

    <events>
          <event name="BulletHitsBigRock">
               <property name="target" type="BigRock"/>
          </event>
          <event name="BulletHitsLittleRock">
               <property name="target" type="LittleRock"/>
          </event>
          <event name="LittleRockHitsBigRock">
               <property name="source" type="LittleRock"/>
               <property name="target" type="BigRock"/>
          </event>
          <event name="BigRockHitsBigRock">
               <property name="source" type="BigRock"/>
               <property name="target" type="BigRock"/>
          </event>
          <event name="BigRockHitsShip">
               <property name="source" type="BigRock"/>
               <property name="target" type="Ship"/>
          </event>
          <event name="LittleRockHitsShip">
               <property name="source" type="LittleRock"/>
               <property name="target" type="Ship"/>
          </event>
          <event name="BulletHitsShip">
               <property name="target" type="Ship"/>
          </event>
```

FIG. 24B

```
            <event name="BigRockMoves">
                 <property name="target" type="BigRock"/>
             <property name="x" type="int"/>
             <property name="y" type="int"/>
            </event>
            <event name="LittleRockMoves">
                 <property name="target" type="LittleRock"/>
             <property name="x" type="int"/>
             <property name="y" type="int"/>
            </event>
            <event name="ShipMoves">
                 <property name="target" type="Ship"/>
             <property name="x" type="int"/>
             <property name="y" type="int"/>
            </event>
      </events>
      <rules>
            <rule name="RuleOne" id="1" event-type="BulletHitsBigRock"
event-ref="event">
             <split result="brSplinters" ref="event.target"
type="BigRock" splinters="3"/>
             <set ref="score.score">
                 <add>
                     <value>score.score</value>
                     <value>event.target.score</value>
                 </add>
             </set>
            </rule>
            <rule name="RuleTwo" id="2" event-
type="BulletHitsLittleRock" event-ref="event">
             <set ref="score.score">
                 <add>
                     <value>score.score</value>
                     <value>event.target.score</value>
                 </add>
             </set>
             <disappear ref="event.target"/>
            </rule>
            <rule name="RuleThree" id="3" event-
type="LittleRockHitsBigRock" event-ref="event">
             <disappear ref="event.source"/>
            </rule>
            <rule name="RuleFour" id="4" event-
type="BigRockHitsBigRock" event-ref="event">
             <disappear ref="event.source"/>
             <disappear ref="event.target"/>
            </rule>
```

FIG. 24C

```
           <rule name="RuleFive" id="5" event-type="BigRockHitsShip"
event-ref="event">
            <disappear ref="event.target"/>
           </rule>
           <rule name="RuleSix" id="6" event-type="LittleRockHitsShip"
event-ref="event">
            <disappear ref="event.target"/>
           </rule>
           <rule name="RuleSeven" id="7" event-type="BulletHitsShip"
event-ref="event">
            <set ref="score.score">
                <add>
                    <value>score.score</value>
                    <value>1000</value>
                </add>
            </set>
           </rule>
        <rule name="RuleEight" id="8" event-type="BigRockMoves" event-
ref="event">
            <move-to ref="event.target" x="event.x" y="event.y"/>
        </rule>
        <rule name="RuleNine" id="9" event-type="LittleRockMoves"
event-ref="event">
            <move-to ref="event.target" x="event.x" y="event.y"/>
        </rule>
        <rule name="RuleTen" id="10" event-type="ShipMoves" event-
ref="event">
            <move-to ref="event.target" x="event.x" y="event.y"/>
        </rule>
      </rules>
</game-schema>
```

FIG. 25A

Example Domain Grammar Files: Alien Schema

```
<?xml version="1.0" encoding="UTF-8"?>

<game-schema name="WhoHitMe" play-area-name="gameBoard" play-area-
dimension="2">
      <enum name="AlienStatus">
            <enum-list-value>Live</enum-list-value>
            <enum-list-value>Dead</enum-list-value>
      </enum>
      <enum name="ShipStatus">
            <enum-list-value>Active</enum-list-value>
            <enum-list-value>Decommissioned</enum-list-value>
      </enum>

      <score-card type="Score" name="score">
            <property name="score" type="int" init-value="0"/>
      </score-card>

    <game-piece type="Alien" name="alien">
        <property name="health" type="AlienStatus" init-
value="AlienStatus.Live"/>
        <property name="worth" type="int"/>
    </game-piece>
      <game-piece type="Ship" name="ship">
            <property name="status" type="ShipStatus" init-
value="ShipStatus.Active"/>
      </game-piece>

    <events>
            <event name="RocketHit">
                  <property name="targetAlien" type="Alien"/>
                  <property name="sourceShip" type="Ship"/>
            </event>
            <event name="ObjectHitShip">
                  <property name="source" type="Alien"/>
                  <property name="target" type="Ship"/>
            </event>
      </events>
      <rules>
            <rule name="RuleOne" id="1" event-type="RocketHit" event-
ref="rocketHitEvent">
```

FIG. 25B

```
            <if>
                <eq>
                    <value>rocketHitEvent.sourceShip.status</value>
                    <value>ShipStatus.Active</value>
                </eq>
                <then>
                    <set ref="score.score">
                        <add>
                            <value>score.score</value>
                            <multiply>

<value>rocketHitEvent.targetAlien.worth</value>
                                <value>2</value>
                            </multiply>
                        </add>
                    </set>
                    <set ref="rocketHitEvent.targetAlien.worth">
                        <divide>

<value>rocketHitEvent.targetAlien.worth</value>
                            <value>2</value>
                        </divide>
                    </set>
                    <if>
                        <le>

<value>rocketHitEvent.targetAlien.worth</value>
                            <value>5</value>
                        </le>
                        <then>
                            <disappear
ref="rocketHitEvent.targetAlien"/>
                        </then>
                    </if>

                    <move-to ref="rocketHitEvent.targetAlien" x="5"
y="11"/>
                </then>
            </if>
           </rule>
           <rule name="RuleTwo" id="2" event-type="ObjectHitShip"
event-ref="objectHitEvent">
            <set ref="score.score">
                <subtract>
                    <value>score.score</value>
                    <value>objectHitEvent.source.worth</value>
                </subtract>
            </set>
```

FIG. 25C

```
            <split result="alientSplinters"
ref="objectHitEvent.source" type="Alien" splinters="2">
                <split-property name="worth" type="int"
factors="1.25,.75"/>
            </split>
            <new ref="newObj" type="Alien"/>
            <set ref="newObj.worth">
                <value>12</value>
            </set>
           </rule>
           <rule name="RuleThree" id="3" event-type="ObjectHitShip"
event-ref="ch">
            <set ref="ch.target.status">
                <enum-value>ShipStatus.Decommissioned</enum-value>
            </set>
            <enable-rule ref="1011"/>
            <disable-rule ref="1012"/>
            <end-game message="Ship is destroyed"/>
           </rule>
      </rules>
</game-schema>
```

FIG. 26A

Design Test
Introduction

This exercise presents a system design problem. It provides you with an opportunity to showcase your design skills. While it is important for you to solve the problem, the focus is not just on "producing working code." The focus is also on your design skills. You are rewarded for the quality of your design. Read this entire document before proceeding.

Problem Statement

Write a program that implements the rules of a simulated game such that your program correctly tracks the game's state (i.e., game piece locations and game score) at slices of time or "Clock Tick." There is a simulator that conducts the game, an event channel that transmits events (Clock Tick and "Stop Game"), and a query channel that you can use to receive information about the game's state (like the next location of a game piece).

Game pieces (asteroids, rocks, and comets) move around randomly in the game. The game's state changes at Clock Tick events. The query channel provides the next location of a game piece, given its ID. After processing the game rules (see Rules of the Game) during a Clock Tick event, you report the game's state back to the simulator. The exercise is over when you receive and correctly process a Stop Game event.

The following rules of the game govern the behaviour of the game pieces, which interact through collisions. A collision occurs when one or more game pieces occupy the same location at the same time.

Rules of the Game

1. When an asteroid and a rock collide
    a. Increase game score by 100
    b. Destroy the asteroid and the rock
    c. Create two comets at the location of the collision
2. When an asteroid and comet collide
    a. Increase game score by 50
    b. Destroy the comet
3. When a comet and rock collide
    a. Increase the score by 25
    b. Destroy the comet and the rock
    c. Create a new asteroid at the location of the collision

FIG. 26B

Layout of the Test

- An MS Visual Studio 2010 project is provided
- A main class called "CSG.MyGame" is provided. Do NOT change the name or the name space of this class.
- You are to implement the "execute" method in "CSG.MyGame" class. This method is to implement your solution completely.
- The following classes are provided for you:

| Name of the class | Description |
|---|---|
| com.cobbsystemsgroup.hcam.designtest.Simulator | Represents the simulator that is conducting the game |
| com.cobbsystemsgroup.hcam.designtest.QueryChannel | Provides game information when queried |
| com.cobbsystemsgroup.game.events.EventChannel | Carries the events the simulator is sending |
| com.cobbsystemsgroup.game.events.EventDTO<br>(CSG.EventDTO in C#) | A Data Transfer Object representing an Event |
| com.cobbsystemsgroup.hcam.designtest.EventInfo | Provides string constants used when interacting with the EventChannel and EventDTO objects |
| com.cobbsystemsgroup.game.basic.Location | A simple interface representing a location in the game |
| com.cobbsystemsgroup.game.lib.Location2D | A class representing a 2-dimentional location (implements Location interface) |
| com.cobbsystemsgroup.hcam.designtest.ScriptReader<br>(CSG.ScriptReader) | A utility class to read the XML script files given |
| com.cobbsystemsgroup.hcam.designtest.XMLGenerator<br>(CSG.XMLGenerator) | A utility class to generate the XML for reporting game details to the Simulator |

FIG. 26C

- Instances of QueryChannel and EventChannel are provided as protected members in the class CSG.MyGame
- Flow of the game:
  - The game starts with a set of "game pieces" (an XML script file provides the starting game pieces)
  - You are to instantiate CSG.MyGame class and then call the method play(script-folder, script-file-name) where

- script-folder: a folder containing one or more XML script files
    - script-file-name: name of a XML script file
  - play() calls your execute()
  - Your code should create the "game pieces" in the XML script file given. Don't apply rules at this time. Register game pieces with the query channel using 0 as the tick number.
  - Then listen on EventChannel for events and process events. The EventDTO class provides the details of the event.
  - You are to process Clock Tick events received. Your program is to stop when you receive the Stop Game event
  - On Clock Tick
    - Obtain the current tick number by invoking EventDTO.getProperty(EventInfo.CLOCK_TICK_NUMBER);
    - If you create a new game piece you register it with the QueryChannel using the method "register" passing the (current) tick number
    - For the game pieces, get their next "location" from the QueryChannel and move the pieces to their respective new locations
    - Apply the "Rules of the Game." The movement of game pieces causes collisions and thus triggers rules. Processing a rule does NOT trigger other rules. See "A Note on Processing Collisions and Rules" below.
    - Report the game state as XML using the Simulator.reportGameState() method

FIG. 26D

Sample Game State in XML

A sample of the game state XML is given below

```
<game>
<property name="score" value="350"/>

<comet>
    <location x = "0" y = "8"/>
</comet>
<asteroid>
    <location x = "1" y = "5"/>
</asteroid>
<asteroid>
    <location x = "0" y = "6"/>
</asteroid>
<asteroid>
    <location x = "8" y = "7"/>
</asteroid>
<comet>
    <location x = "0" y = "8"/>
</comet>
<rock>
    <location x = "3" y = "0"/>
</rock>
</game>
```

FIG. 26E

A Note on Processing Collisions and Rules

The following example demonstrates how a collision occurs and triggers rules:

On a particular Clock Tick, say tick number 5, consider that three asteroids (A1, A2 and A3) and two rocks (R1 and R2) move to the same location L1 (5, 7). There will be 10 collisions on this tick as shown below.

| Collision # | Game Pieces | Rule Triggered |
|---|---|---|
| 1 | A1,R1 | 1 |
| 2 | A1,R2 | 1 |
| 3 | A2,R1 | 1 |
| 4 | A2,R2 | 1 |
| 5 | A3,R1 | 1 |
| 6 | A3,R2 | 1 |
| 7 | A1,A2 | Not Applicable |
| 8 | A1,A3 | Not Applicable |
| 9 | A2,A3 | Not Applicable |
| 10 | R1,R2 | Not Applicable |

Collisions 1, 2, 3, 4, 5, and 6 trigger Rule 1 (stated in Rules of the Game). Collisions 7, 8, 9, and 10 do not trigger any rules even though they are recognized as valid collisions. The collisions on this Clock Tick would destroy A1, A2, A3, R1, and R2, and would create 12 comets.

FIG. 27A

| Name of the class | Description |
|---|---|
| com.cobbsystemsgroup.hcam.designtest.Simulator | Represents the simulator that is conducting the game |
| void reportGameState(int tickNumber, String gameStateInXML)<br><br>throws SimulatorNotRunningException | Reports the game state for a tick number to the simulator |
| int getScore() | Returns score (number of ticks for which the reported state is correct) |
| com.cobbsystemsgroup.hcam.designtest.QueryChannel | Provides game information when queried |
| int register(String gamePieceType, int tickBeingProcessed) | Registers a newly created game piece and returns an ID for the game piece.<br><br>tickBeingProcessed – tick number being processed |
| Location getNextLocation(int gamePieceId) | Returns the next location for the game piece with the given gamePieceId |
| com.cobbsystemsgroup.game.events.EventChannel | Carries the events the simulator is sending |
| EventDTO getNextEvent() | Returns the next event received on the event channel |
| com.cobbsystemsgroup.game.events.EventDTO<br><br>**(CSG.EventDTO if using C#)** | A Data Transfer Object representing an Event |
| String getEventType() | Returns type of the event |
| Object getPropertyValue(String name) | Returns the value of the (game) property such as "score" |
| com.cobbsystemsgroup.hcam.designtest.EventInfo | Provides string constants used when interacting with the EventChannel and EventDTO objects |
| com.cobbsystemsgroup.game.basic.Location | A simple interface representing a location in the game |

FIG. 27B

| | |
|---|---|
| com.cobbsystemsgroup.game.lib.Location2D | A class representing a 2-dimentional location (implements Location interface) |
| Int getX() | Returns x-coordinate |
| Int getY() | Returns y-coordinate |
| com.cobbsystemsgroup.hcam.designtest.ScriptReader<br>**(CSG.ScriptReader if using C#)** | A utility class for reading and parsing the XML script files |
| Map<String, String> getGameAttributes()<br>(IDictionary<string, string> getGameAttributes() in C#) | Returns the attributes on the <game> tag as a Map/Dictionary |
| Map<String, Object> getGameProperties()<br>(IDictionary<string, object> getGameProperties() in C#) | Returns information on the <property> tags as a Map/Dictionary |
| List<Map<String, Object>> getGamePieces()<br>(IList<IDictionary<string, object>> getGamePieces() in C#) | Returns information on the game pieces tags as a list of Map/Dictionary. Map/Dictionary objects in the list can represent one game piece |
| com.cobbsystemsgroup.hcam.designtest.XMLGenerator<br>**(CSG.ScriptReader if using C#)** | A utility class for converting the information of game pieces into XML for reporting to the Simulator |
| void setGameProperties(Map<String, Object> properties)<br>(void setGameProperties(IDictionary<string, object>) in C#) | Set the properties |
| void setGamePieces(List<Map<String, Object>>)<br>(void setGamePieces(IList<IDictionary<string, object>>) in C#) | Sets information of the game pieces as a list of Map/Dictionary. Map/Dictionary objects in the list can represent one game piece |
| String generateXml()<br>(string GeneratedXmlString property in C#) | Returns the XML string to pass to the Simulator |

Evaluate Results

FIG. 30

Example Process Flow

An example process flow is described below with reference to the following Example Use Case Flow. Not all of these steps are included in every embodiment.

1. The client provides the Job Specifications including some or all of the identified elements to the Candidate Manager.

2. The recruiter (or someone in the capacity of proposing candidates) provides Candidate Information for available candidates to the Candidate Manager including some or all of the identified elements.

3. The Candidate Manager can create a Simulation Spec including some of all of the identified elements. The Candidate Manager can also create a Candidate List.

4. The Candidate List and Simulation Spec are provided to the SimulationGenerator which generates Simulation Packages including some of all of the identified elements. The Candidate Simulation Repository Manager can be used to store this data.

5. The Provisioner reads the Simulation Packages.

6. The Provisioner creates the Simulation Environment for running the assessment.

7. The Simulation Environment provides Simulation Scripts and Tools used by the Candidate to perform the assessment.

8. The Candidate participates in the simulation and thereby provides a Candidate Submission.

9. The Simulation Environment runs the Candidate Submission with a Local Simulator.

10. The Local Simulator generates Simulation Results.

11. The results of the simulation are reported back to the Candidate as Simulator Results.

12. The Candidate makes a final Candidate Submission

13. The Candidate Submission is stored in the Candidate Simulation Repository Manager.

14. The Analysis Engine reads the Candidate Submission.

15. The Candidate Simulation is then processed by the Master Simulator.

16. The Candidate Simulation Results are produced by the Master Simulator.

17. The Candidate Simulation Analysis is stored in the Candidate Simulation Repository Manager.

18. The Simulation Reporter reads the Candidate simulation Analysis.

19. The Simulation Reporter generates and Analysis Report which is returned to the client in a formatted report or dashboard.

FIG. 40A
Candidate Research
Demographics
Resume Search
Profile Search
Filter Criteria
Exercise
Category
Benchmarks
Lists
Name
Robert Emmett Sweeney
Shicheng Jiang
Subrata Paul
Jan Lee
Krishna Challa

SYSTEMS AND METHODS FOR CANDIDATE ASSESSMENT

CROSS-REFERENCE TO RELATED APPLICATIONS

This application hereby claims priority under 35 U.S.C. section 119(e) to U.S. Provisional Application Ser. No. 61/609,303, entitled "Systems and Methods for Candidate Assessment," by inventors Wayne Cobb, Christine Juettner, Karunakar Neriyanuru, and Stephen Ray and filed on Mar. 10, 2012, the contents of which are herein incorporated by reference.

FIELD OF THE INVENTION

The present invention relates generally to techniques for assessing the qualifications of a candidate for a position using metrics calculated and analyzed by a computerized system.

BACKGROUND OF THE INVENTION

It is currently very difficult to identify qualified candidates for certain employment positions. Candidates have diverse educational and professional backgrounds which are often extremely difficult to compare. Candidates may also represent their experience using subjective terms. In some cases, the sheer number of candidates in the pool may make identifying optimal candidates difficult.

Most of the current assessment techniques for candidates in programming positions combine simplistic assessments with subjective evaluations. For example, software written by a candidate as part of a qualification exercise may be assessed by a human reviewer who makes a subjective conclusion as to the quality of the candidate solution. These approaches are time consuming and prone to error because they are not subjective and do not scale efficiently.

BRIEF DESCRIPTION OF THE DRAWINGS

FIG. 5 illustrates example components of the system.

FIG. 6 illustrates example dimensions.

FIG. 16 illustrates an example user story.

FIGS. 17-25C illustrate example domain grammar files.

FIGS. 26A-26E illustrate an example design test.

FIGS. 27A-27B illustrate example classes for performing a simulation and assessment.

FIGS. 30-31 illustrate an example process flow.

DETAILED DESCRIPTION

Figure 1:
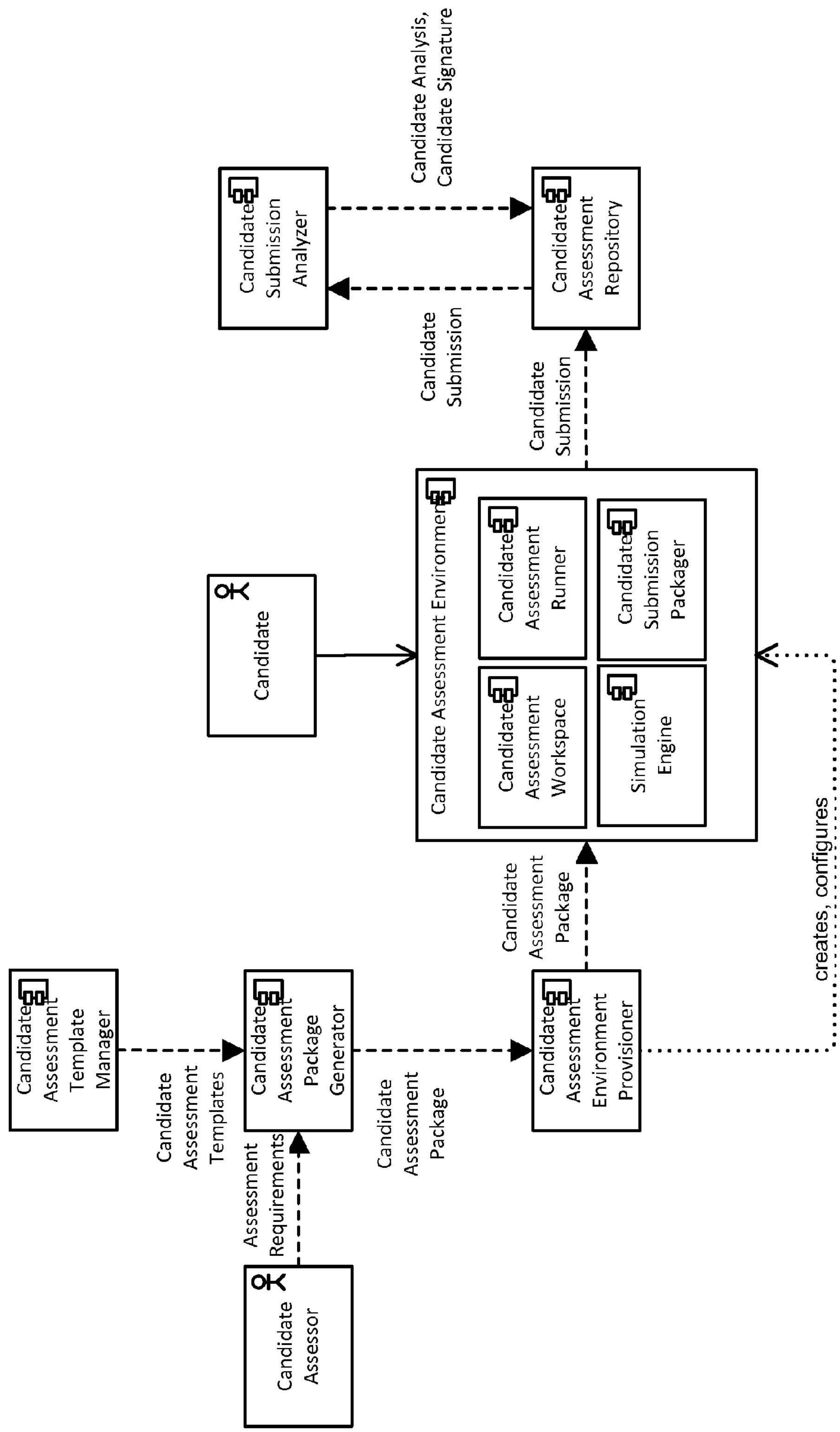
FIG. 1 illustrates an example architecture overview.

In the following description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps below may be presented in a certain order, in some cases, the ordering may be changed so that certain inputs are provided at different times or in a different order without changing the function of the systems and methods described. The procedures described herein could also be executed in different orders. Additionally, various computations that are described below need not be performed in the order disclosed, and other embodiments using alternative orderings of the computations could be readily implemented. In addition to being reordered, the computations could also be decomposed into sub-computations with the same results.

The Candidate Assessment System (CAS) can include systems and methods for providing services for assessing the skill level of candidates across a broad range of problem domains, competency areas, and/or problem types. The CAS can be used to assess a candidate's response to any quantifiable set of inputs and outputs. The assessments provided by the CAS can also be used to group candidates together in clusters. The CAS can also be used for educational purposes by training candidates for the various problem types.

Below, example architectural designs for a CAS are described. Alternative embodiments can include some or all of the features of the examples. As used herein, the term candidate refers to any person or group of people who are being assessed for any purpose.

The CAS can be configured to deliver some or all of the following features:

1. Creation of a repository of assessment templates covering a broad range of problem domains, competency areas, and problem types. For example, a domain could be financial services. A problem type could be asset allocation or portfolio rebalancing. A competency area could be software development or project management.

2. Generation of targeted assessment packages from the assessment templates and contextual information specifying the requirements of a specific suite of assessments.

3. Provisioning of candidate assessment environments configured with the tools and documentation a candidate uses to take an assessment.

4. Running candidate assessments within the candidate assessment environment.

5. Packaging of candidate solutions and transmission to a central assessment repository.

6. Analysis of candidate solutions by providing various metrics or signatures based on the candidate solutions.

As non-limiting examples, the following usage scenarios may employ the CAS:

1. Recruitment filtering: Pre-screening of candidates prior to investment of employee resources in the hiring process.

2. Talent scouting: Matching of candidates against a target signature or metrics.

3. Training (internal or external): Delivery of targeted training to internal or external resources.

4. Human Capital Valuation: Assessment of the competencies and skills of a workforce.

5. Benchmarking/Clustering: Comparison of the competencies and skills of a workforce against a broader talent base.

Figure 2:
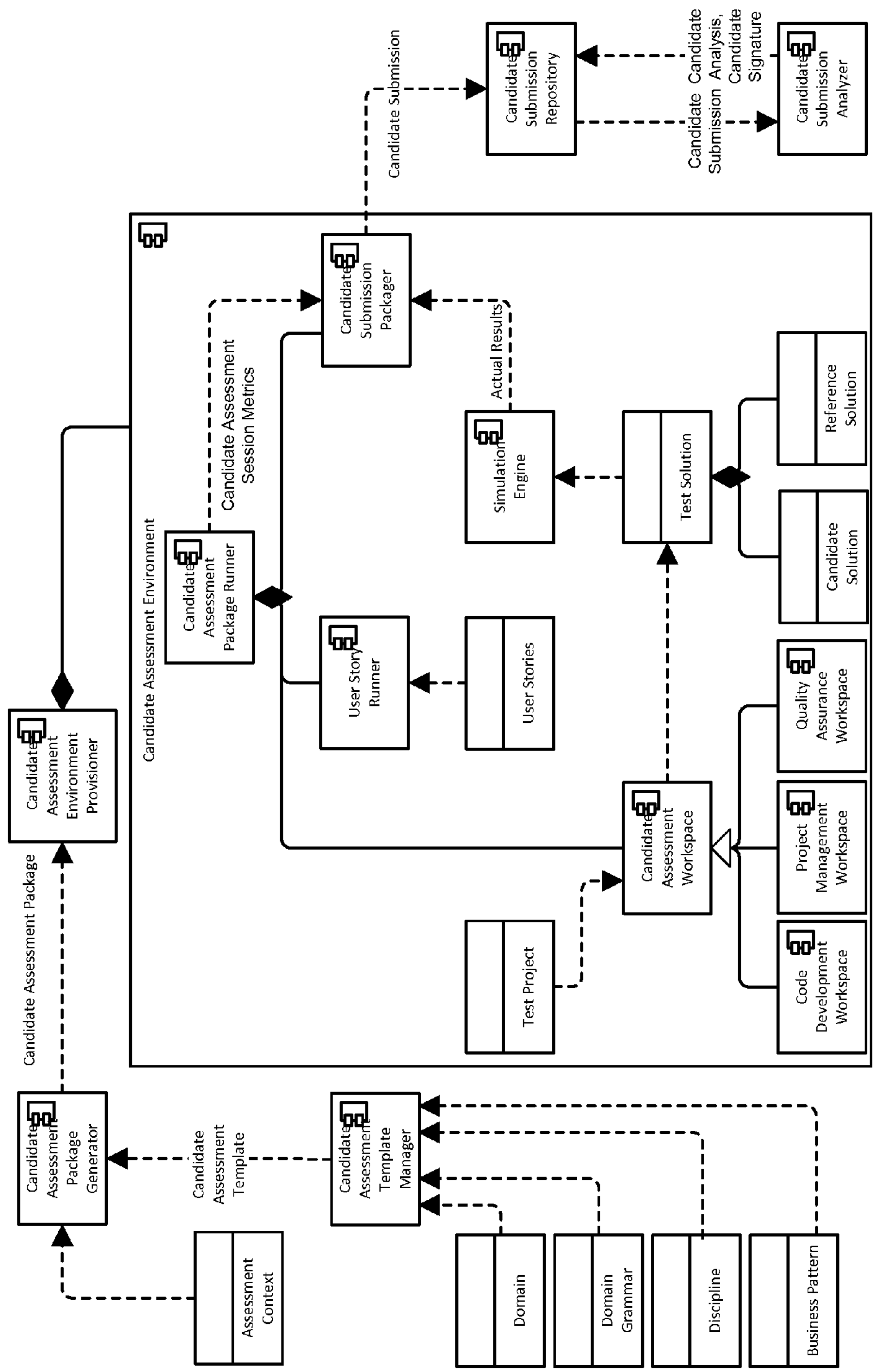
FIGS. 2-4 illustrate example implementations of the components.
Figure 3:
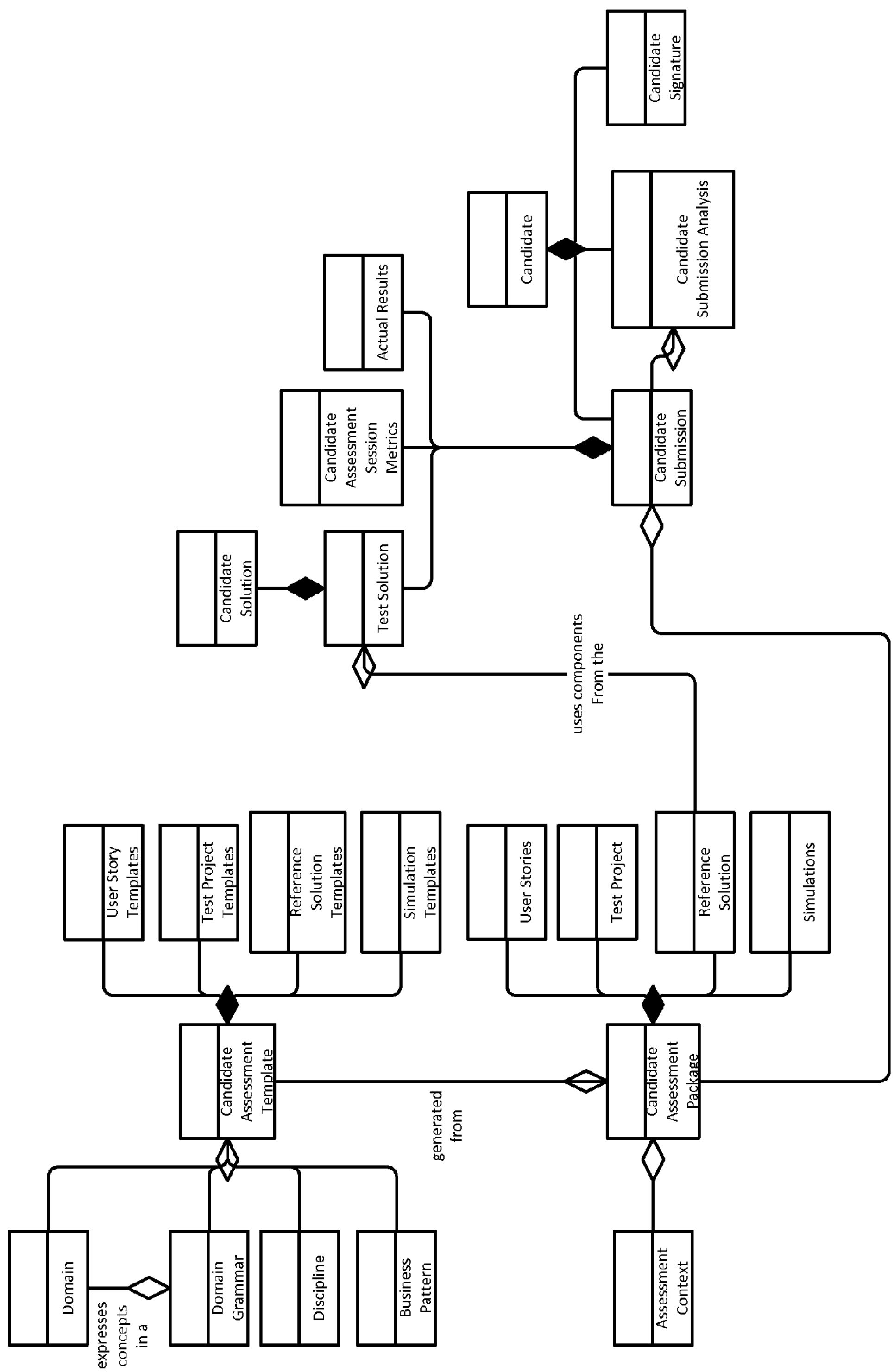
Figure 4:
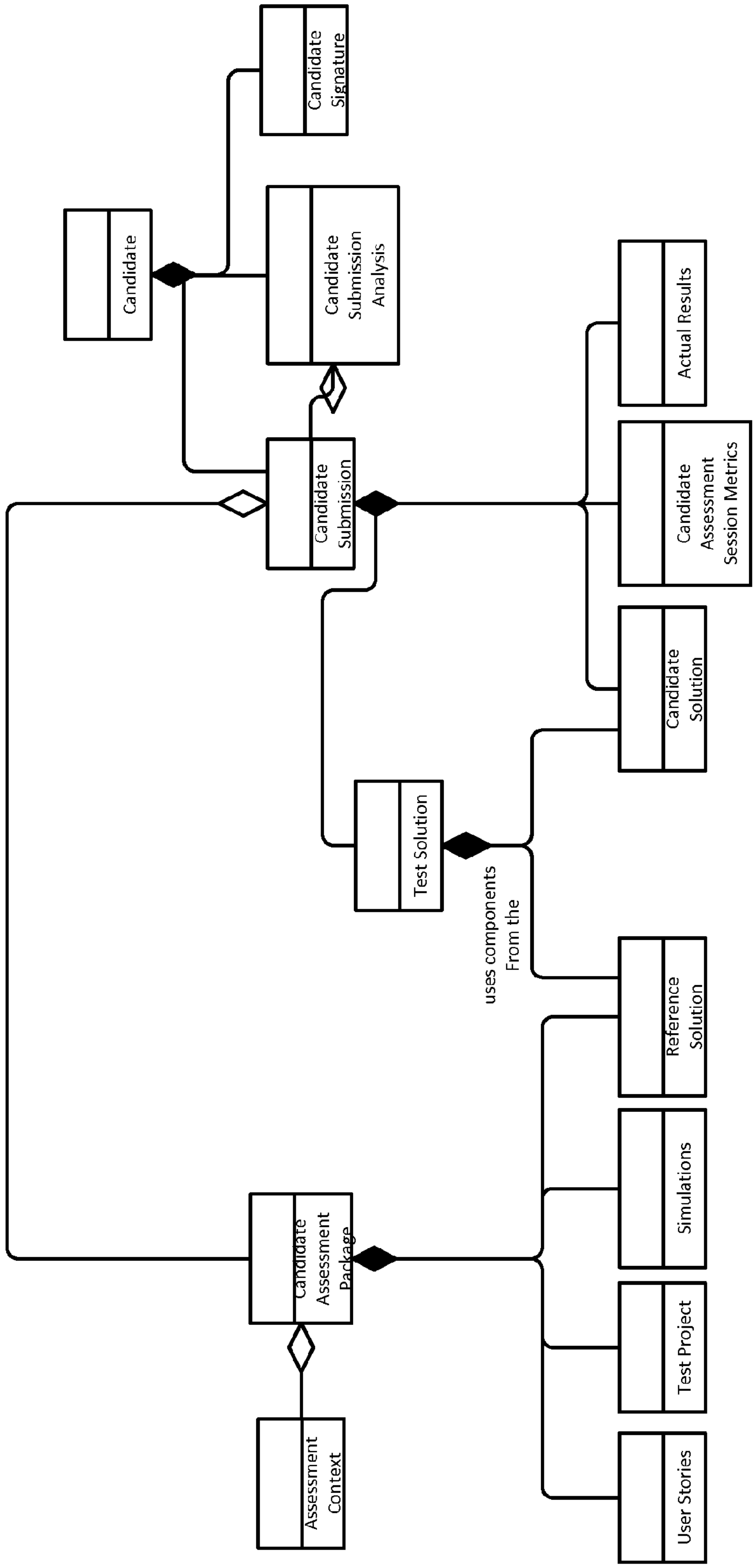

An overview of an example embodiment of the system is presented in FIG. 1. Further details of the system are presented in FIGS. 2-4. Example components as illustrated are described in the table presented in FIG. 5. Individual components are described in more detail below. In some embodiments, the assessment environment can be operated using individual virtual machines instantiated for each testing session using commercially available virtualization tools. In those embodiments, the virtual machine could have the simulator pre-configured in the machine.

Alternatively, the testing sessions could be provided using a "simulator as a service" model if the candidate has appropriate development tools available. For example, a user may be running Visual Studio™ or Eclipse™ locally, and the user may need to only download stub code to interact with the simulator as a service over a network, such as the Internet. In this environment, it is not necessary to download a copy of the simulator. In these environments, the server can create logs based on any behavioral aspect of the user's use of the simulator during an exercise.

Types of Exercises/Assessments

As non-limiting examples of candidate assessments, a questionnaire exercise can be comprised of any combination of: one or more questionnaires; an analyst exercise containing one or more analysis simulations and zero or more questionnaires; a developer exercise containing one more development simulations, zero or more analysis simulations and zero or more questionnaires. The CAS can include a configurable workflow engine that enables configuration of a script which can be played back to the candidate. The system can also include a questionnaire builder for selecting candidate questions from a database of questions.

Candidate Assessment Template Manager Component

The Candidate Assessment Template Manager component manages the repository of Candidate Assessment Templates. CAS Templates provide a set of reusable assets that can be instantiated into specific CAS packages. Templates can be characterized using some of all of the dimensions illustrated in FIG. 6.

Example Candidate Assessment Template Data Entities

Figure 7:
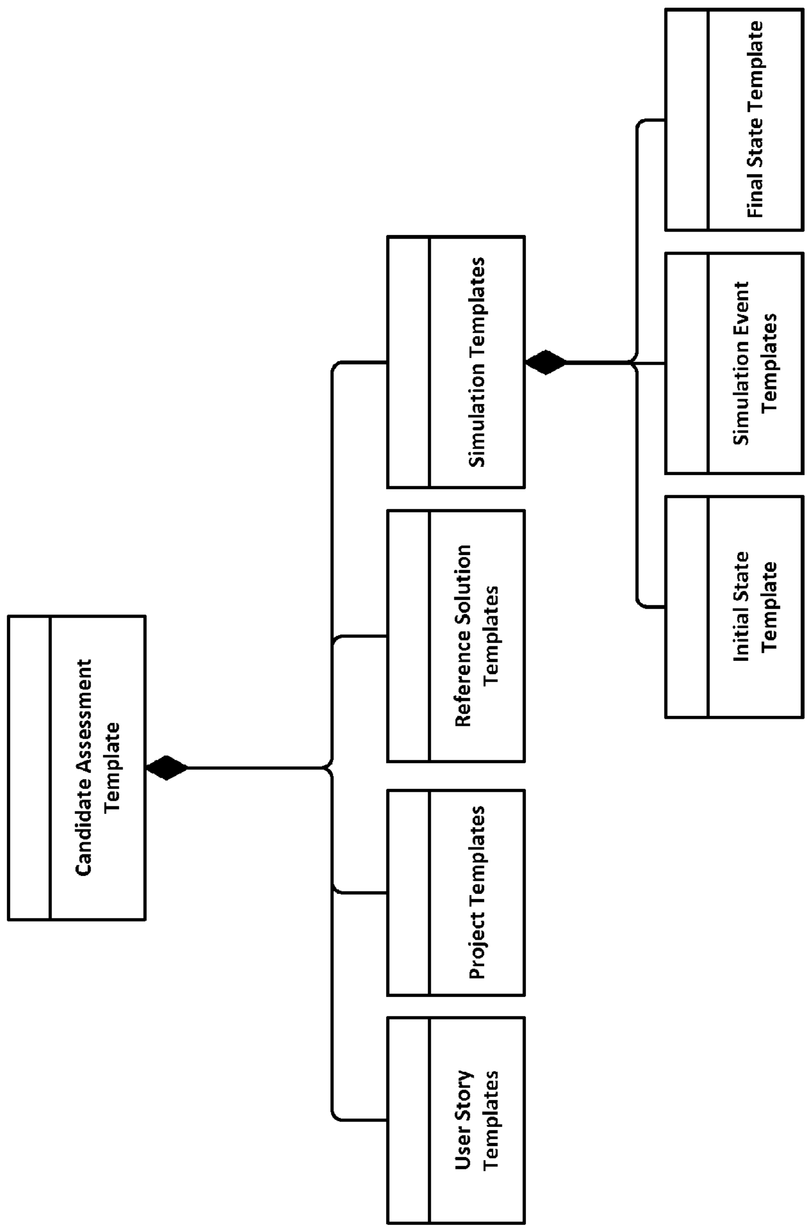
FIG. 7 illustrates an example candidate assessment template.

A Candidate Assessment Template can be composed of some or all of the following data entities illustrated in FIG. 7.

User Story Templates

User Story Templates are parameterized User Stories from which families of specific User Stories can be generated. CAS Templates can contain a sequence of User Story Templates. In some embodiments, the templates can represent a progression from simpler to more complex problems a candidate is required to solve. User Stories can be used, in some environments, to describe the requirements for a focused increment of functionality, such as a specific feature to be implemented. In some embodiments, the CAS can use a Behavior Driven Design style of user story. The template manager can include multiple user stories including a set of requirements which can be selected individually to tune up and/or down the level of user story complexity.

Project Templates

The system can be configured so that, during an assessment, a candidate works within a candidate assessment workspace provisioned with the tools for solving the problem with which the candidate has been presented. The discipline dimension of the assessment and the assessment requirements together determine which tools are provisioned. For example, a software development (discipline) C# (assessment requirement) assessment can result in provisioning the candidate workspace with Microsoft Visual Studio™.

Project Templates are parameterized versions of project files that can be loaded into the suite of tools related to a discipline. During an assessment, the candidate can be presented with a project instantiated from a project template. In the C# example used previously, this could be a console project loaded into Visual Studio™ with missing code that the candidate will then provide in order to implement a user story.

Reference Solution Templates

The CAS has the capability to assess candidates with varying skill and competency levels. To support this, the CAS provides a reference solution to the problems presented in user stories. The skill level of a candidate being assessed determines the elements of a reference solution with which the candidate is provided, and which elements the candidate is required to provide.

Reference Solution Templates are parameterized versions of solutions to user stories. In some embodiments, during an assessment, a candidate is presented with a sub-set of the reference solution pertaining to the assessment context.

Simulation Templates

During an assessment, a candidate provides a solution to the problem with which the candidate has been presented. In order to determine whether the candidate has solved the problem correctly, the CAS executes the candidate's solution by simulating the execution of one or more user stories. To test the candidate's solution, three pieces of information can be used:

1. An initial state for the simulation.

2. A set of events to execute that exercise the candidate's solution.

3. The expected final states and/or intermediate states of the simulation.

Simulation Templates are parameterized versions of initial states, intermediate states, event sequences, and expected final states.

In simulations including multiple intermediate points for assessment, at one or more points during the assessment, the CAS can execute the candidate's solution as described above. In those examples, the system can use a simulation template including parameterized versions of intermediate states.

When a candidate indicates that the candidate has solved the problem described in a user story, the workspace exercises the candidate's solution using the Simulator and the information in the Simulations instantiated from Simulation Templates.

Final State Template

Some embodiments may include a Final State Template. Other embodiments may not necessarily include a Final State Template. In those embodiments, two simulations may be running at or about the same time and the state may be compared at multiple steps or points during the assessment.

Domain Grammar

As described above, there are a number of different types of templates that can be used in the creation of candidate assessment packages. In some embodiments, a Domain Grammar can be used to describe templates. Domains can be associated with a Domain Grammar and candidate assessment templates created for a domain can be expressed in terms of the domain grammar.

The process of instantiating a candidate assessment package from a candidate assessment template can include interpreting the domain grammar and replacing formal parameters with actual parameters derived from the assessment context. The domain grammar can include scenario files and schema files. Examples are presented below.

Candidate Assessment Package Generator Component

The Candidate Assessment Package Generator can be configured to create some or all of a complete package of candidate assessment user stories, a reference solution, projects for loading into a workspace, and simulations for testing candidate solutions.

A Candidate Assessor supplies a set of Assessment Requirements that are used to generate a specific Candidate Assessment Package. Some of the types of information contained in assessment requirements can be:

1. The business domain of the assessment. (For example, Gaming, Retail, Financial Services, etc.)

2. The discipline to within which to assess competency. (For example, Software Development, Project Management, etc.)

3. The skill level to assess. (For example, junior/mid-level/senior). The skill level to assess can be defined to include any variation on competency level.

Figure 8:
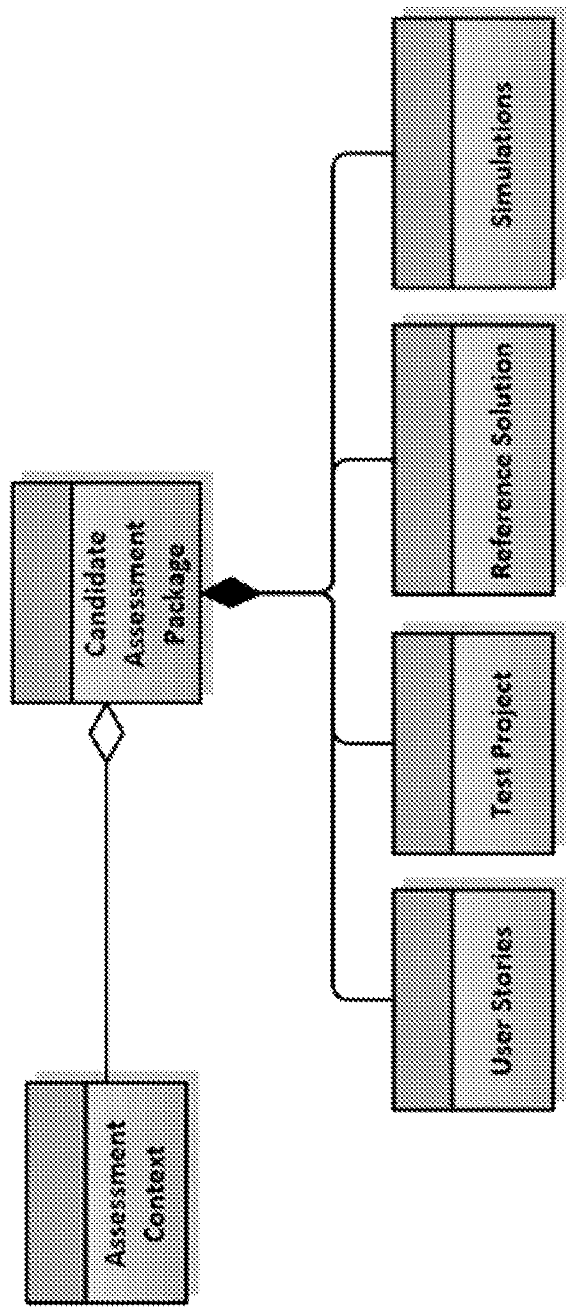
FIG. 8 illustrates an example candidate assessment package entity.

An example Candidate Assessment Package Data Entity is illustrated in FIG. 8. A Candidate Assessment Package can have a parallel structure to the Candidate Assessment Template data entity. Alternatively, it may have a unique structure. Some or all of the four child data entities can be generated by combining the relevant assessment requirements with the corresponding child data entity in the template:

User Story Template+Assessment Requirement→User Story

Test Project Template+Assessment Requirement→Test Project

Reference Solution Template+Assessment Requirement→Reference Solution

Simulation Template+Assessment Requirement→Simulations

As described above, in some embodiments, the domain grammar can define the common language across one or more templates to promote consistency and correctness of generated candidate assessment packages.

Candidate Assessment Environment Provisioner Component

The Candidate Assessment Environment Provisioner can be configured to create the environment a candidate can use when undergoing an assessment. The environment can be a workspace, such as a virtual machine, or any other means for collecting input from a user at a remote location, including a web browser, a dedicated client, or other client application on a desktop or mobile device. The Provisioner can configure the environment based on the contents of the Candidate Assessment Package. As non-limiting examples:

For project management discipline assessments, Microsoft Project™ could be provisioned.

For a Java™ software development assessments, the Eclipse™ development suite could be provisioned.

Candidate Assessment Environment Component

The Candidate Assessment Environment is the computing environment a candidate uses during an assessment. The environment can include some or all of the following four components:

1. A Candidate Assessment Workspace providing the tools, documentation, and other content a candidate can use in taking an assessment.

2. A Candidate Assessment Runner which uses the candidate assessment package to control the execution of the assessment.

3. A Simulation Engine which executes the candidates solutions to the user stories with which they are presented.

4. A Candidate Submission Packager which, on completion of an assessment, packages the candidate's solution into a Candidate Submission and sends it to the Candidate Assessment Repository.

Figure 9:
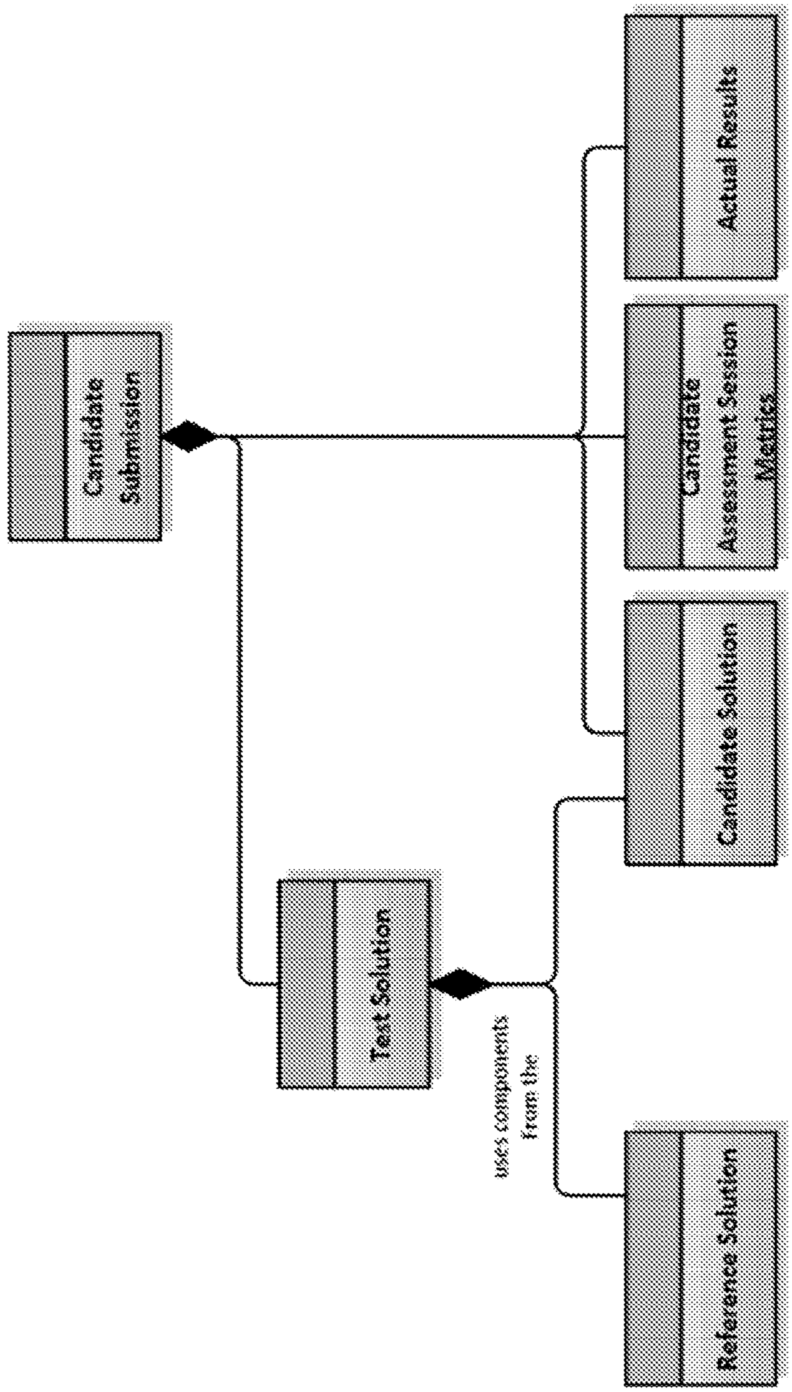
FIG. 9 illustrates an example candidate submission data entity.

An example Candidate Submission Data Entity is illustrated in FIG. 9. The Candidate Submission Data Entity can contain information pertaining to an assessment taken by a candidate. The data entity can include some or all of the following components:

The Test Solution submitted by the Candidate can be a combination of components from the Reference Solution (provided in the Candidate Assessment Package) and components provided by the candidate (Candidate Solution). Assessments can be configured according to candidates with differing skill levels. For example, when assessing lower skill level candidates, more components can be included from the reference solution.

Candidate Assessment Session Metrics can record information such as the time taken to solve a user story and/or the total time taken.

Actual Results are the output from the Simulator. The results can be compared with expected results to determine the quality of the candidate solution. The Actual Results can include results from final states or intermediate states.

Candidate Assessment Repository Component

The Candidate Assessment Repository can be configured to hold one or more candidate submissions. It can provide a centralized information repository for performing additional analysis of individual candidate and/or candidate group submissions. The Candidate Assessment Repository can provide analysis across multiple submissions and enable benchmarking of candidates relative to each other.

Candidate Submission Analyzer Component

The Candidate Submission Analyzer can be used as the analysis engine for producing analytics, insight, and/or information on individual candidates, and/or groups of candidates (e.g. a team of QA engineers), and/or the total candidate universe.

Style Analysis

The Analyzer can assess the style of the candidate submission. For example, style can include how the candidate submission is designed. Style can be the amount of time taken by a candidate before the candidate begins coding a solution. Style can also include names used for programming variables. The Analyzer can include model styles (such as, for example, agile, waterfall, or iterative). In some embodiments, the model style can be based on actual individual simulation results.

The candidate style can be a path through a decision tree. The decision tree can include some or all of the possible decision points in a simulation. Decision points can be associated with certain time intervals, or points in time, or clock ticks. Styles can be compared by comparing decisions at corresponding points on the decision tree. The style analysis can include some or all of the points on the decision tree. The style analysis can include progression analysis of multiple candidate simulations taken over a period of time. The style analysis can include analysis of multiple simulations of an individual candidate and/or multiple simulations of multiple candidates taken over a period of time.

In a project management simulation, for example, the decision tree can include events such as allocating funds, hiring employees, and/or personnel movement. Style can include where and when in the tree certain events occurred. The style can include the distance between nodes in a tree for specified decision points. The style can also include relative location in the tree for specified decision points. Decision points can be associated with timing events or clock ticks in the simulation.

In a coding simulation, the decision tree can include, for example, whether to use recursive functions, or whether to separate out certain events into separate functions, and where and when to identify and fix programming bugs. For example, in a gaming context, a decision tree point can include two graphical objects colliding. In another example, coding decisions taken at a point in the decision tree can be part of the style.

Simulator Generation Engine

Some embodiments can include a Simulation Generator Engine. The Simulation Generator Engine can be comprised of the Candidate Assessment Package Generator and the Candidate Assessment Environment Provisioner. The Simulator Generator Engine can be used to create the Candidate Assessment Environment.

Figure 10:
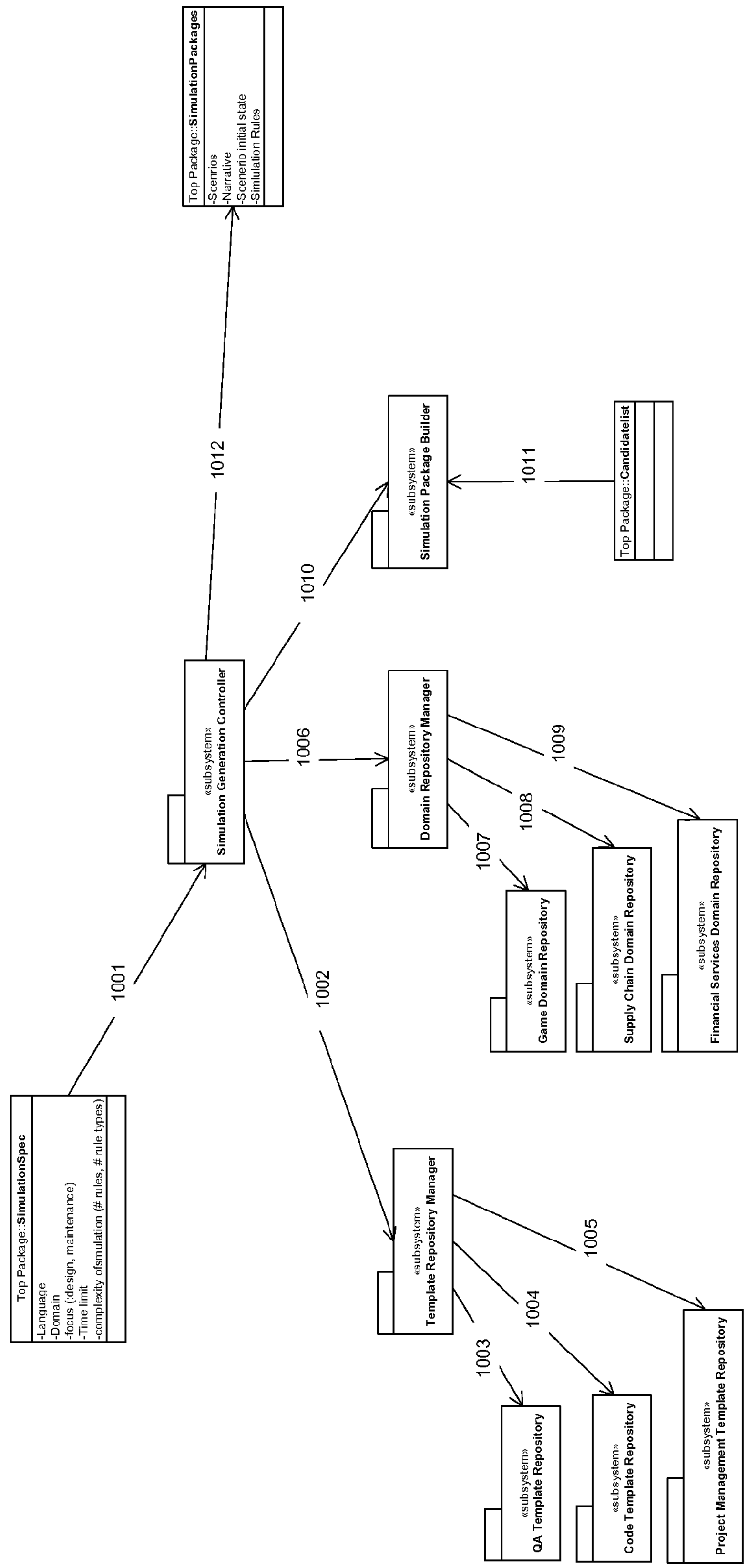
FIG. 10 illustrates an example simulator generator structure.

The following description is made with reference to the following example Simulator Generator structure diagram presented in FIG. 10.

The Inputs to the Simulation Generator Engine can include:

SimulationSpec: Specifies the characteristics of the simulation to be generated.

CandidateList: Details of the candidates scheduled to participate in the simulation.

The Outputs from the Simulation Engine can include:

SimulationPackages: A set of simulation packages for candidates scheduled to participate in the simulation.

The Simulation Engine can be configured to manage the flow of events. For example, the Simulation Engine may execute the following steps:

The Simulation Generation Controller receives a SimulationSpec (1001).

The Simulation Generation Controller requests the type of simulation from the Template Repository Manager (1002).

The Template Repository Manager delegates the request to the repository manager responsible for the type of simulation being generated:

QA Template Repository for quality assurance simulations (1003).

Code Template Repository for code simulations (1004).

Project Management Template Repository for project management simulations (1005).

The Simulation Generation Controller requests domain instantiation properties from the Domain Repository Manager (1006).

The Domain Repository Manager delegates the request to the domain repository responsible for the specific domain for which the simulation is being generated:

Game Domain Repository for gaming simulations (1007).

Supply Chain Domain Repository for the supply chain domain (1008).

Financial Services Domain Repository for the financial services domain (1009).

The bundle of simulation templates and domain instantiation properties is forwarded to the Simulation Package Builder (1010).

The Simulation Package Builder generates simulations by (1011):

merging domain instantiation properties into the simulation templates;

generating a portfolio of simulations by randomizing features of the simulation such as names of the entities being manipulated and the business rules to apply to the simulation; and associating candidates in the candidate list with a simulation selected from the portfolio (which may be random or targeted based on matching candidate properties with simulation properties).

The Simulation Generator Controller delivers the Simulation Packages for further processing (1012).

The simulation engine can be operated with a reference solution. In some embodiments, the simulation engine can use a rules engine in which the rules are embodied in a rules file. In some cases, the simulation requirements for the candidate may be made to conflict so as to introduce bugs into the specification to assess different types of problem solving skills.

A reference solution can be created for the specific purpose of generating a benchmark signature which can be defined as part of search criteria.

Simulation Execution

The simulation can include different types of patterns. Some example simulations can use an interpreter pattern. In these examples, both a candidate solution and a reference solution are provided with the same or a corresponding set of inputs through a script. The script can be provided through a grammar, according to the examples provided herein.

Figure 11:
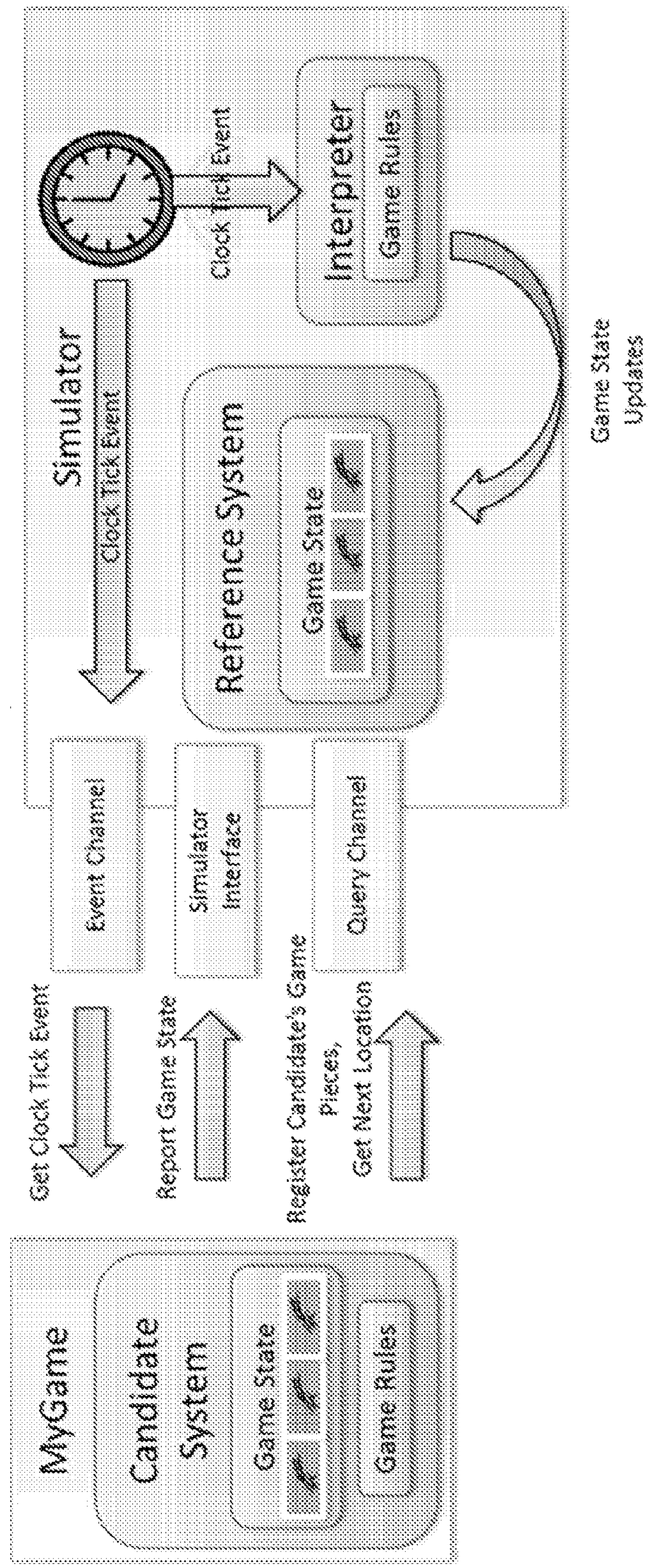
FIG. 11 illustrates an example overview for an interpreter pattern.

An overview of an interpreter pattern is illustrated in FIG. 11. In the illustrated example, the Simulator hosts a Reference System which is listening for clock tick events. In response to a clock tick event, the Reference System changes its state in accordance with a set of defined rules. The candidate's objective is to build the candidate's version of the system that behaves the same as the Reference System. An example flow of events could be:

1. The candidate loads an initial state into the Reference System.

2. The candidate loads the same initial state into the system and implements and registers game pieces with the Simulator.

3. Clock tick event is sent to candidate through the event channel.

4. Candidate gets the next location for candidate's game pieces, candidate moves them, and applies game rules candidate has been given.

5. Candidate then reports the state of candidate's system through the Simulator interface.

6. The Simulator compares the state of candidate's system to the Reference System and reports whether they are equivalent or not.

Figure 12:
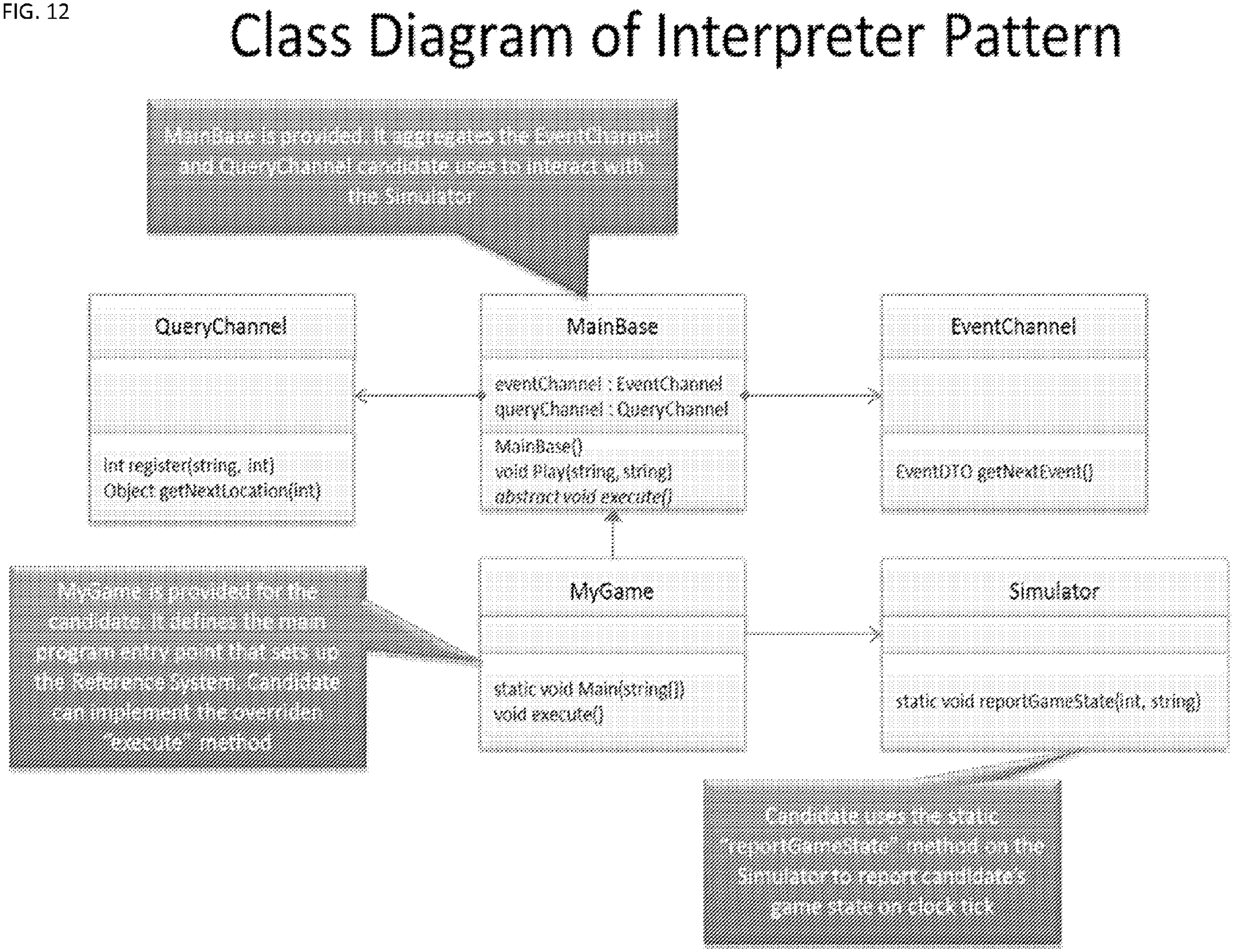
FIG. 12 illustrates an example class diagram for an interpreter pattern.
Figure 13:
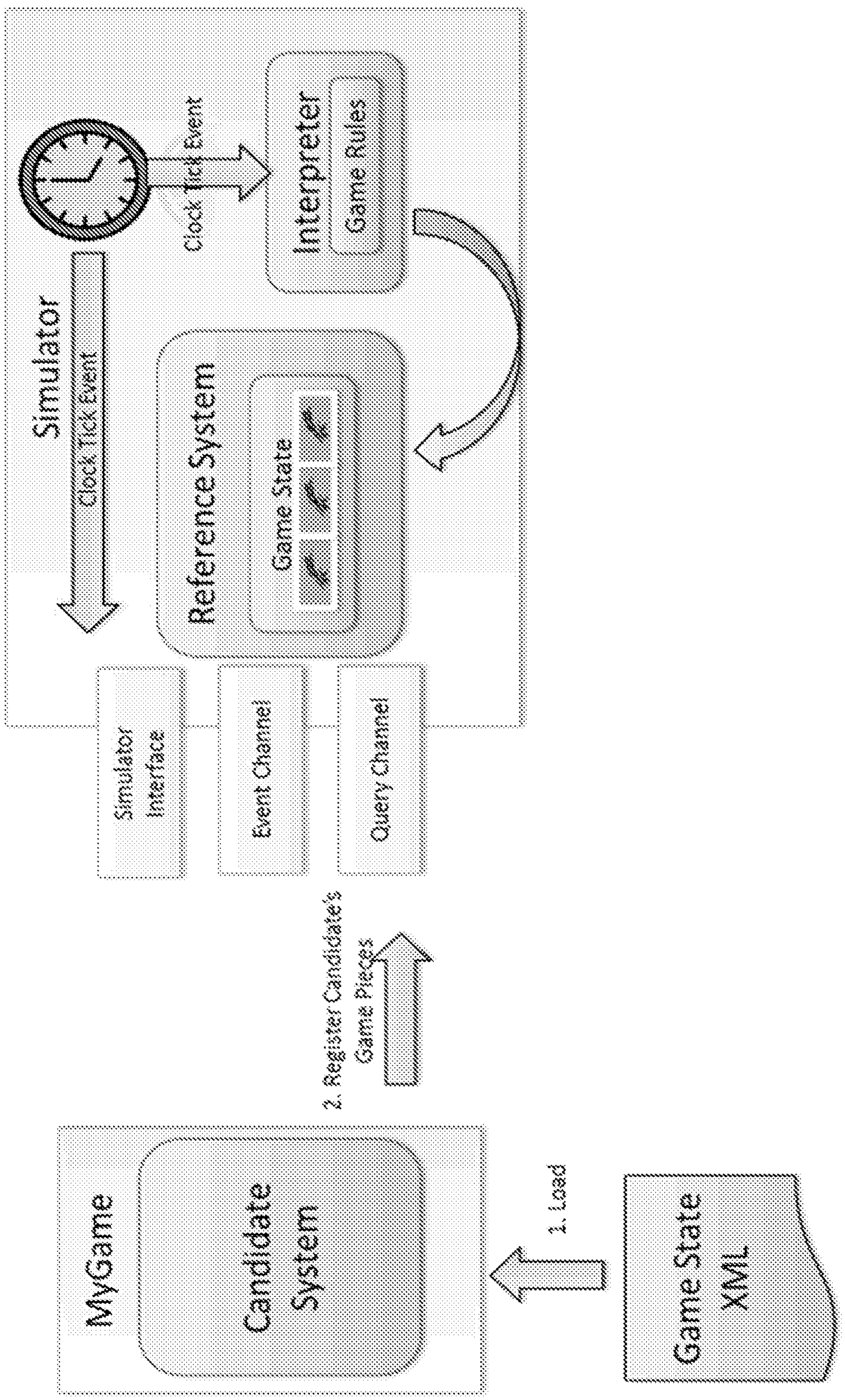
FIG. 13 illustrates an example simulator preparation for an interpreter pattern.

An example class diagram of an interpreter pattern is illustrated in FIG. 12. In the example of the interpreter pattern, the simulator can be prepared as illustrated in FIG. 13. In the example, MyGame.Main can be configured to perform the functions:

instantiate MyGame and calls MyGame.Play, passing the path to the game state XML which the Simulator loads into the Reference System;

MyGame.Play calls candidate's implementation of the abstract method MyGame.execute.

In candidate's implementation of MyGame.execute:

Candidate loads the game state XML into candidate's system and registers game pieces created using QueryChannel.register;

QueryChannel.register returns the id of the game piece which Candidate can remember for later use;

Candidate's System and the Reference System are now ready to be simulated.

Figure 14:
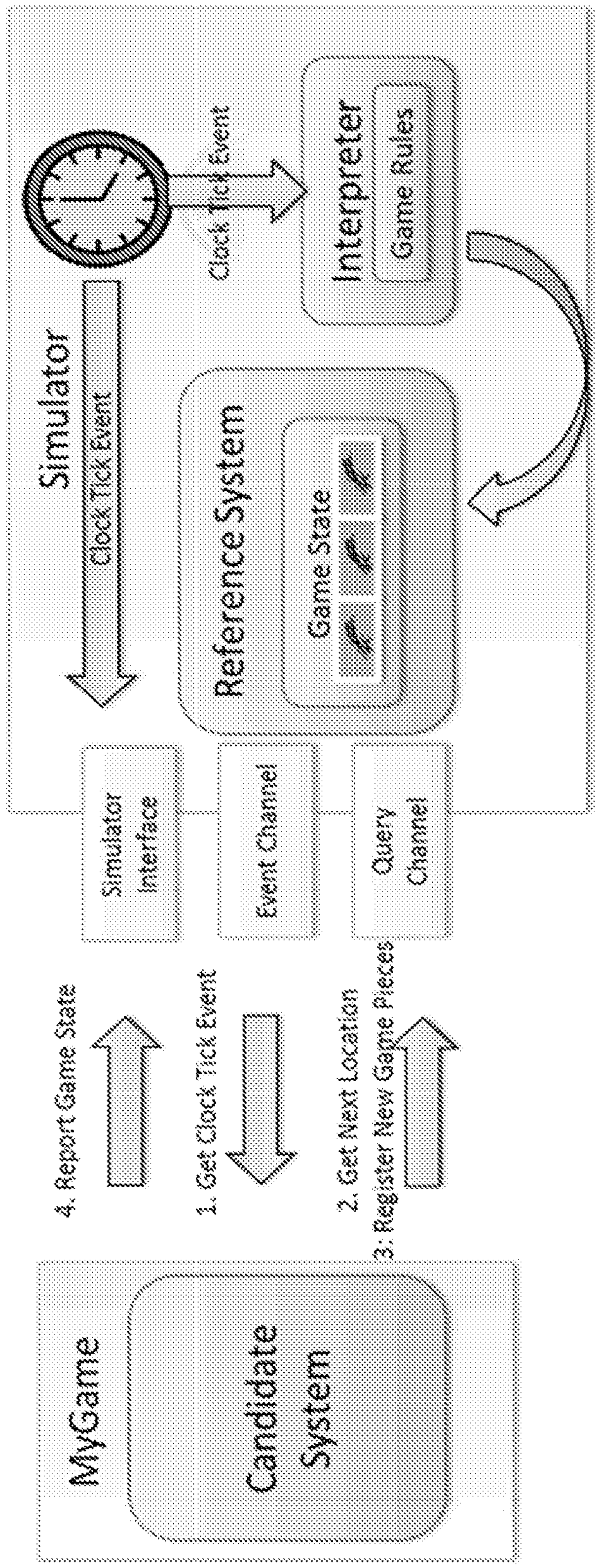
FIG. 14 illustrates an example operation of simulator for an interpreter pattern.

In the example of the interpreter pattern, the simulator can be run as illustrated in FIG. 14. The following steps may be executed:

Get the next clock tick event from the Event Channel;

Get the next location of candidate's game pieces (passing the ID of the game piece returned when candidate registered the game piece when preparing the Simulator);

Apply the rules of the game described in the requirements document;

If the game rules require candidate to create new objects, they can be registered with the Reference System through the Query Channel;

Report candidate's game state in an XML document conforming to the XML schema defined in the requirements document provided to candidate;

The console window can report whether or not the game state of candidate's system matches the game state of the reference system.

The simulator can repeat this sequence of events until candidate receives a stop event.

In other types of simulations, the simulation can model an event handler. In the compilation pattern, a predetermined set of events is provided to the candidate in the simulation. The candidate is tasked with coding in response to those events based on the requirements provided in a user story.

Figure 15:
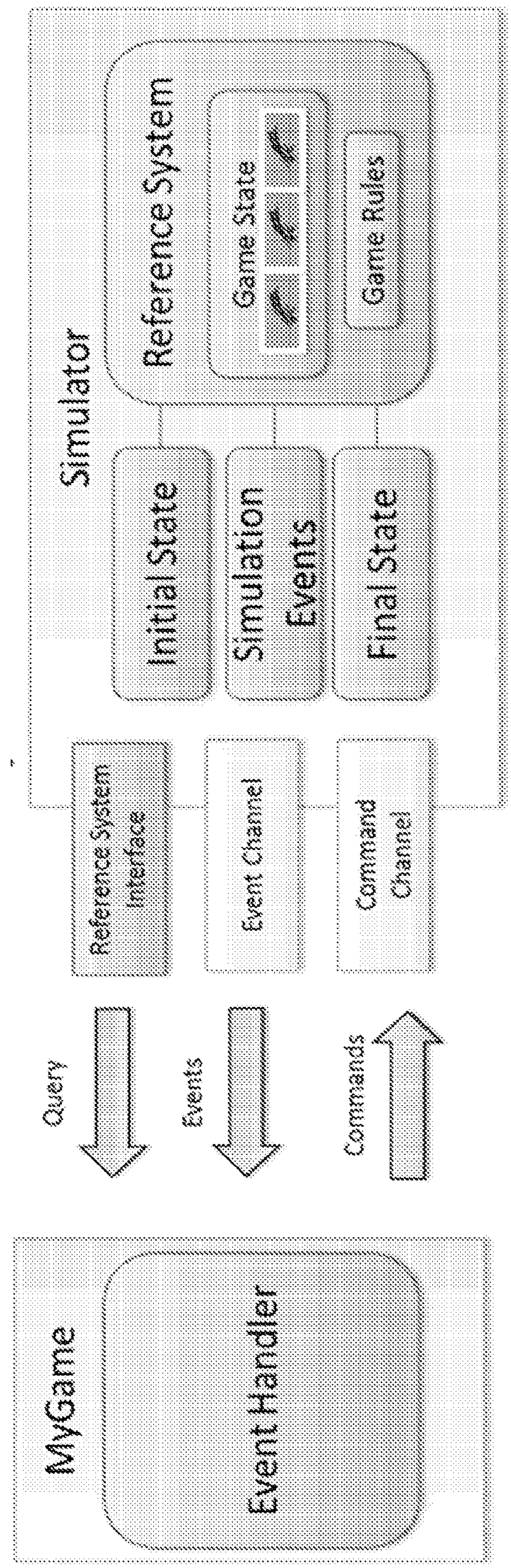
FIG. 15 illustrates an example overview of a compilation pattern.
Figure 28A:
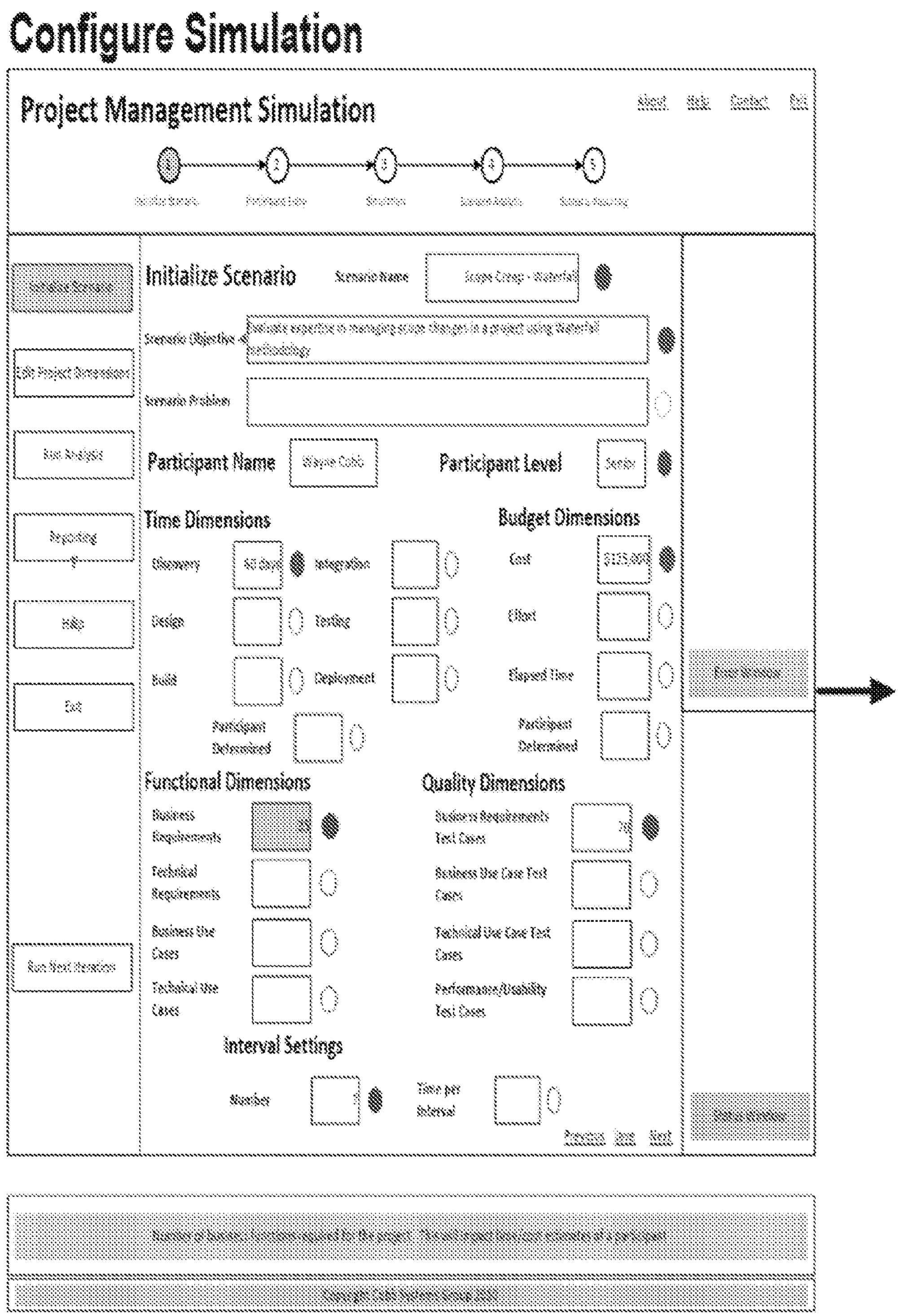
FIGS. 28A-28F illustrate example configurations and interfaces for assessing the performance of a candidate.
Figure 28B:
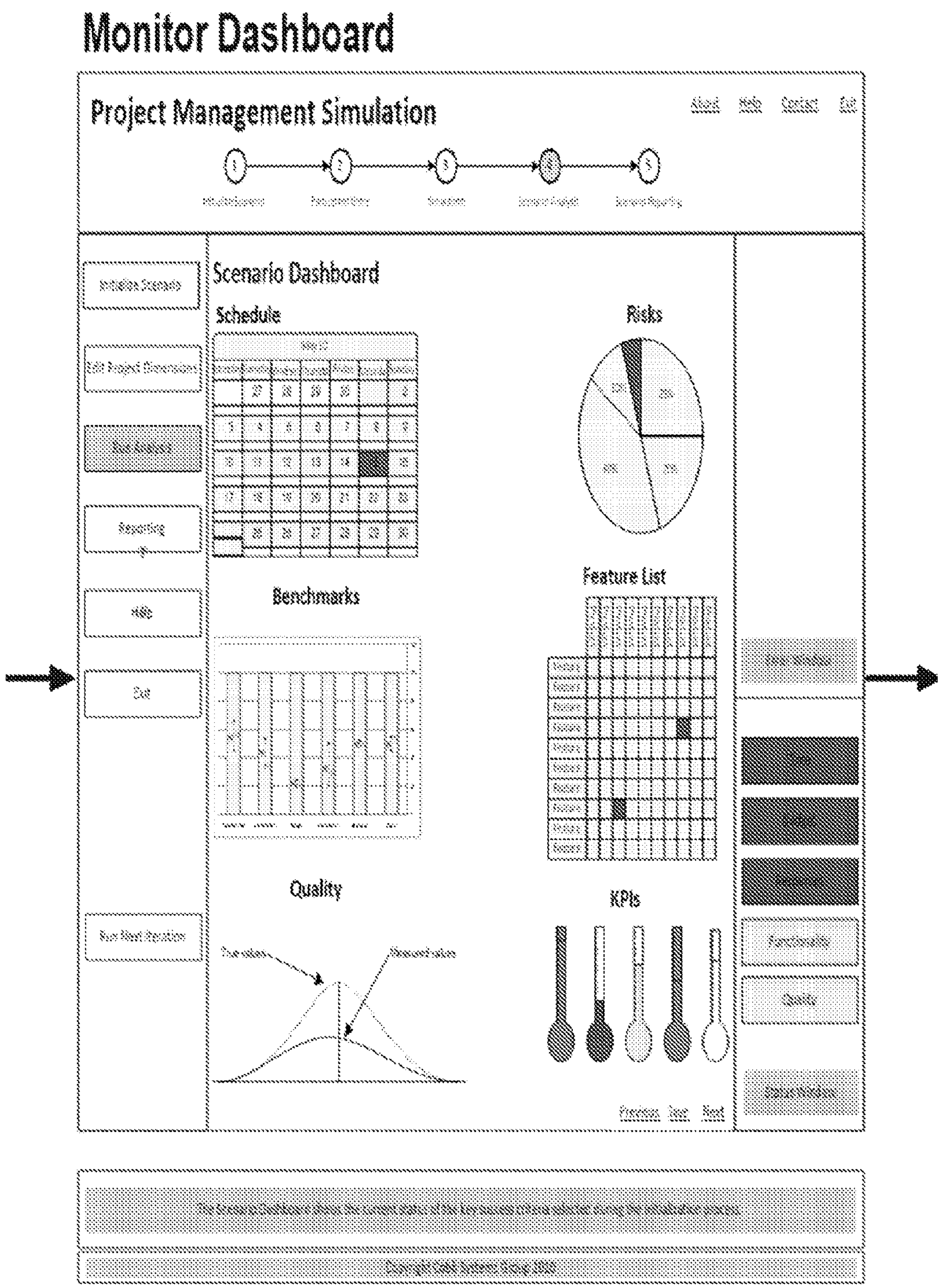
Figure 28C:
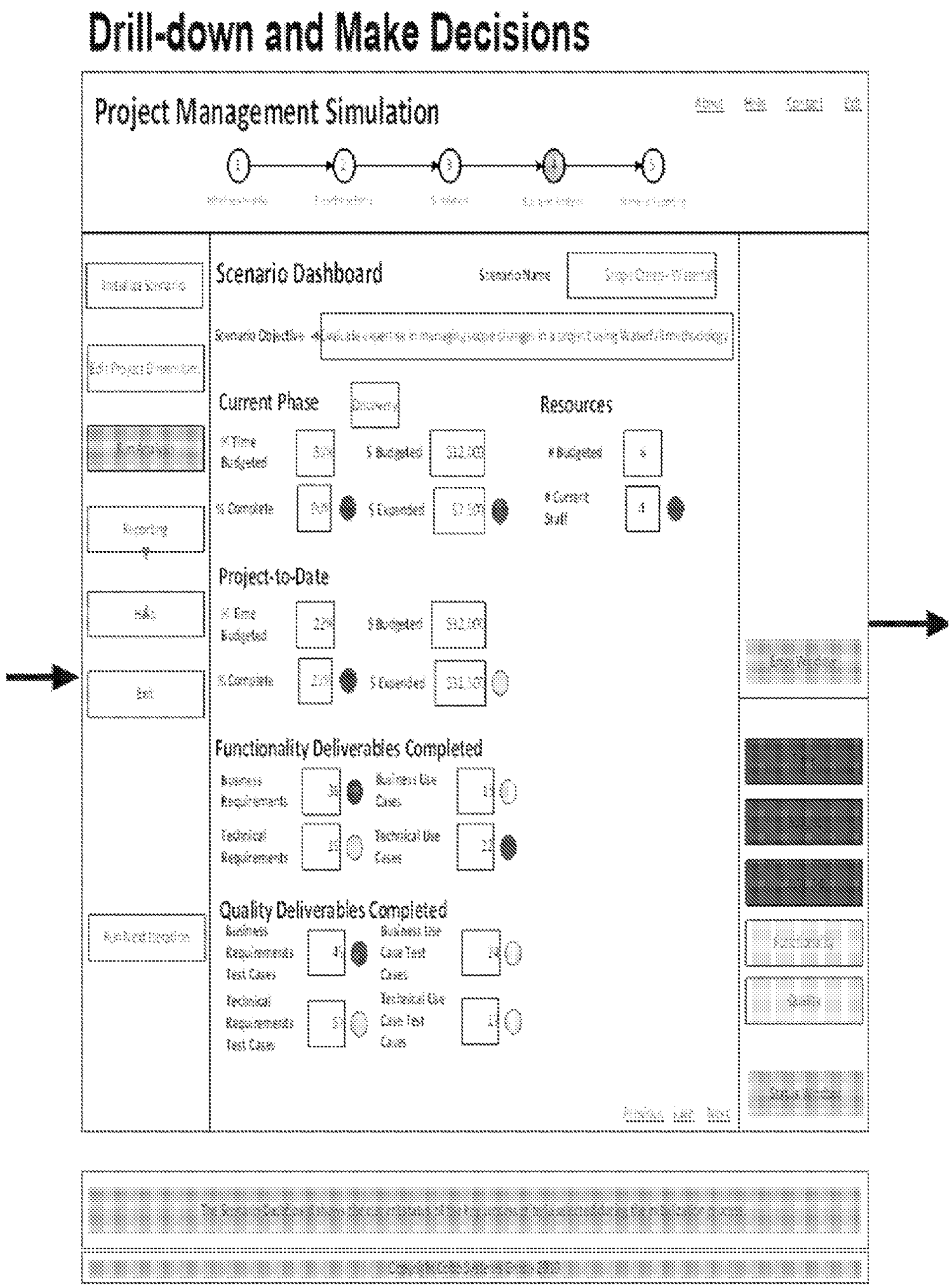
Figure 28D:
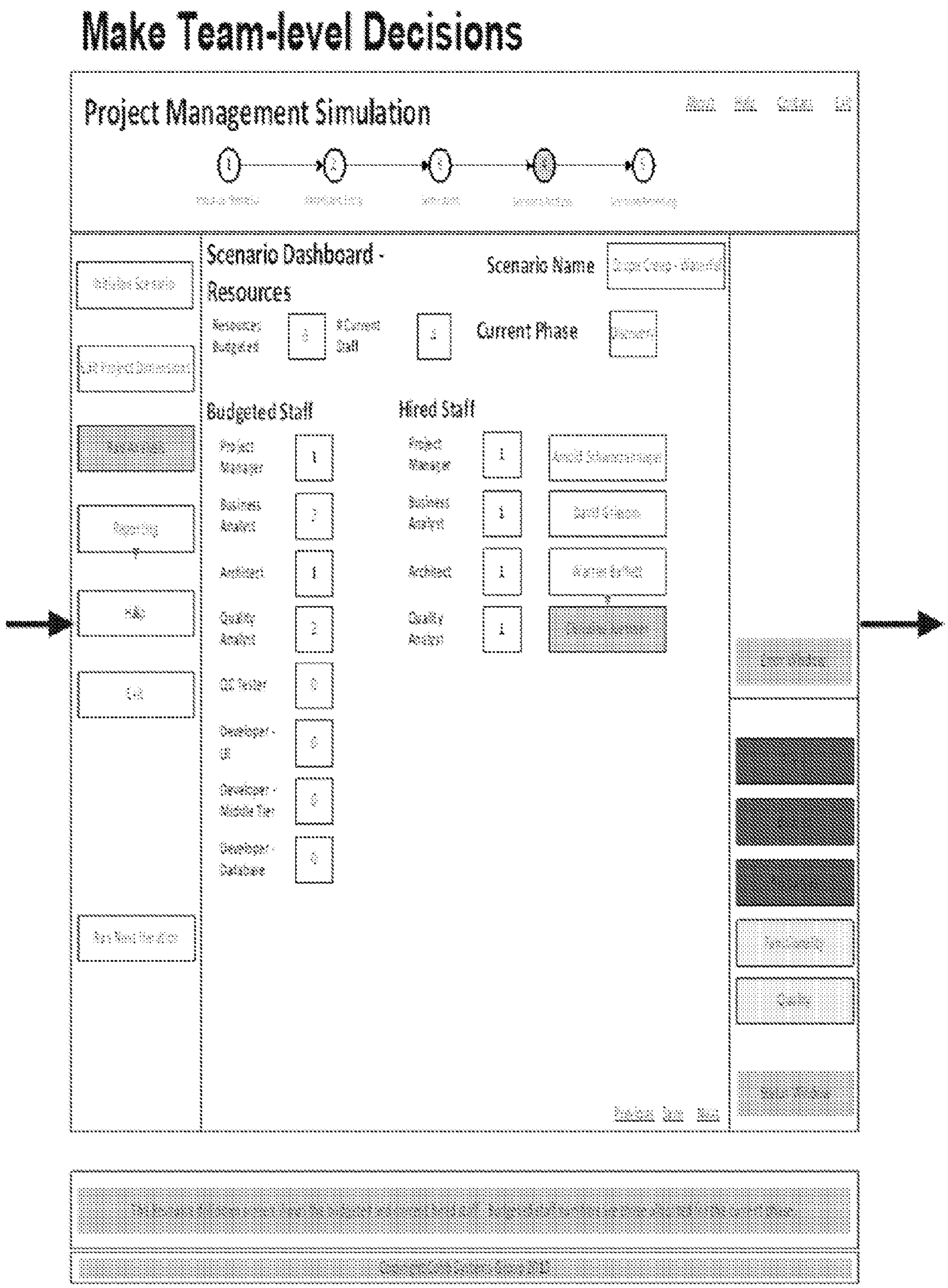
Figure 28E:
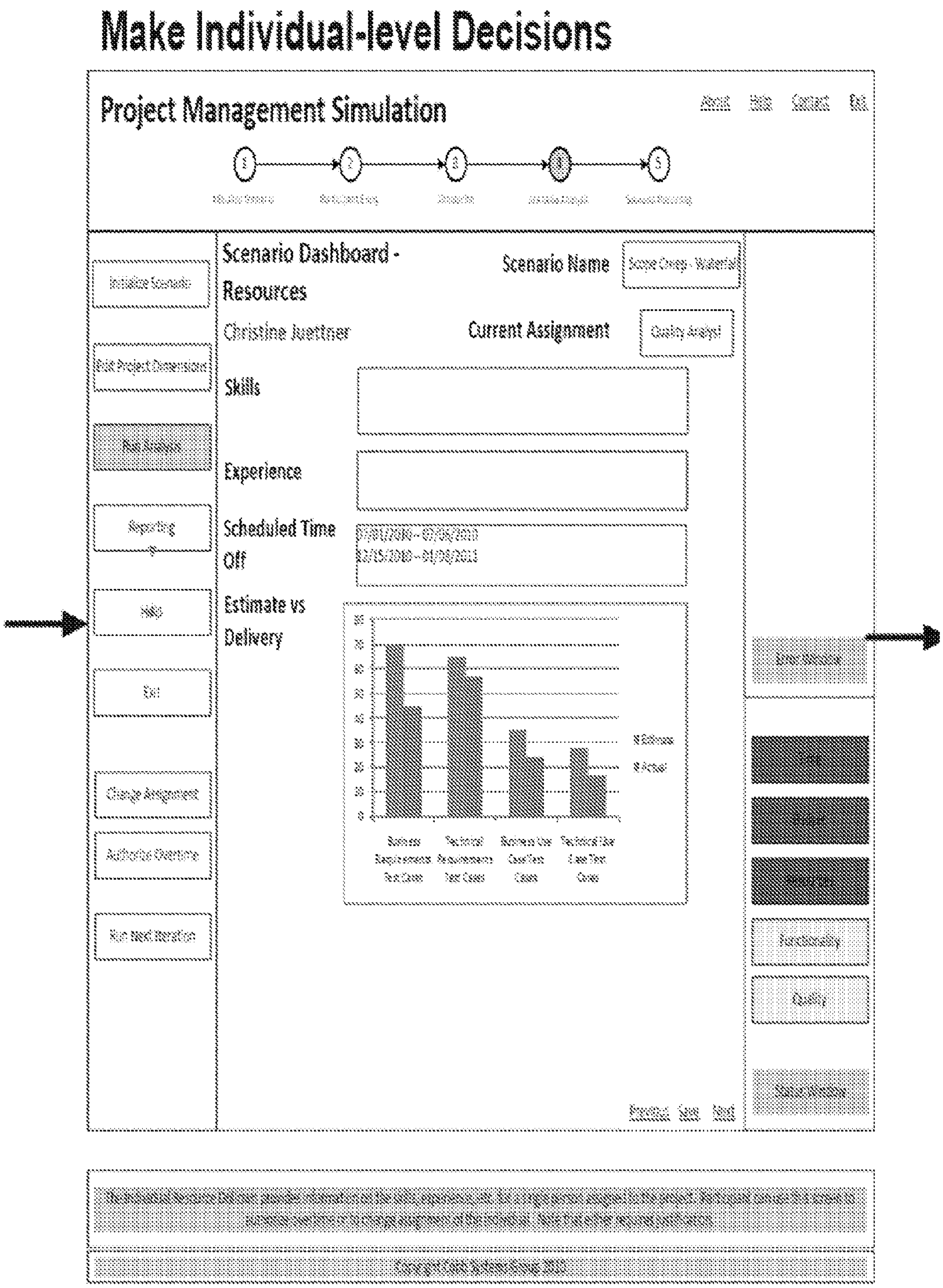
Figure 28F:
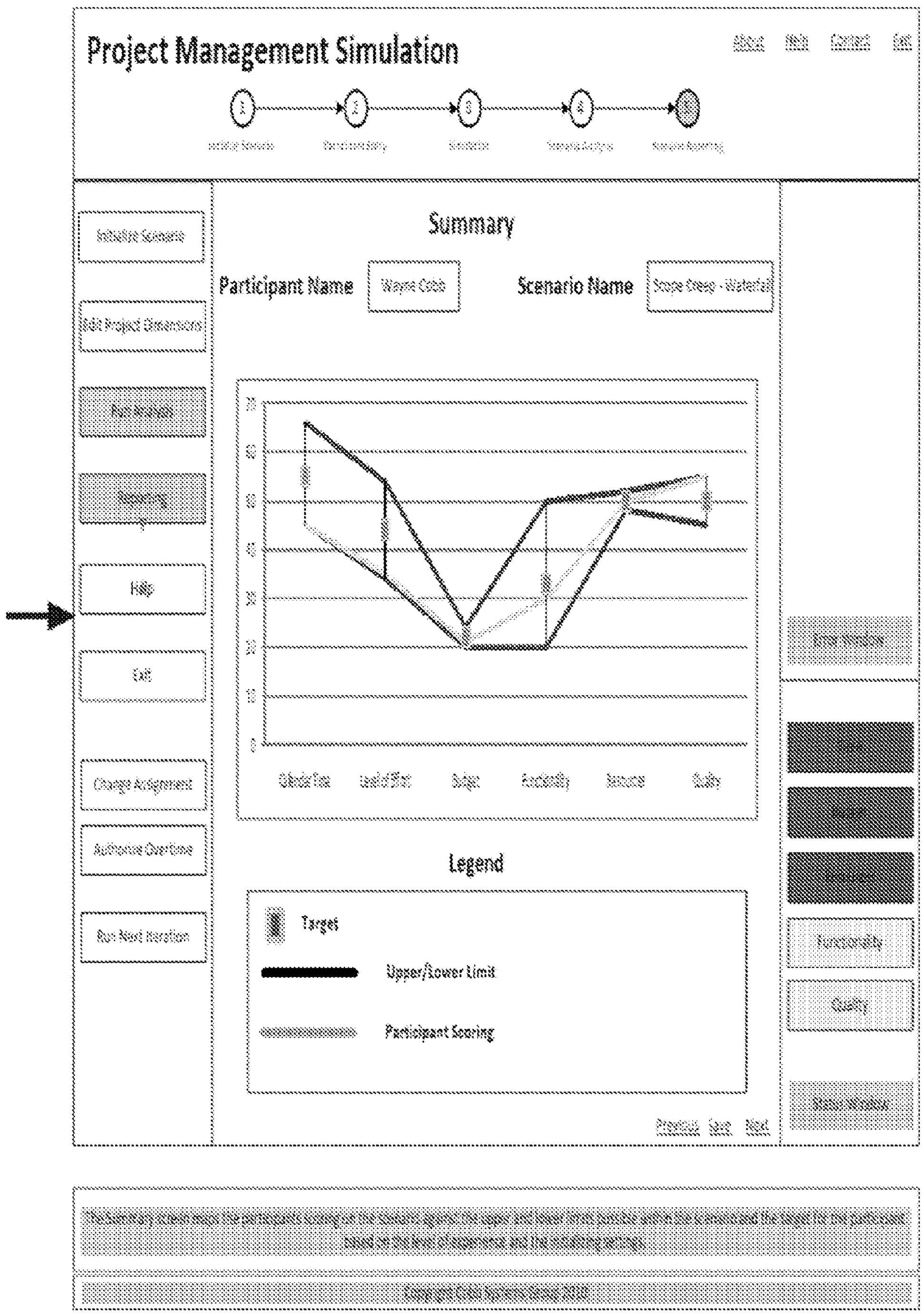

An overview of a compilation pattern is illustrated in FIG. 15. The Simulator hosts two instances of the Reference System, one which holds the initial state of the reference system prior to simulation and the other which holds the final state of the reference system after simulation. A simulation is described in a sequence of simulation events which are sent to the candidate's code in a predefined sequence. The candidate's objective is to build an event handler that handles an event by updating the state of the instance of the reference system that is in the initial state. After events have been processed, the two instances of the reference system should be in the same or corresponding state.

Further Example Embodiments and Use Cases

An example user story is presented in FIG. 16. As discussed in more detail below, example domain grammar files are presented in FIGS. 17-25C. An example design test is presented in FIGS. 26A-26E. Some of all of the illustrated instructions may be provided to the candidate.

The Candidate Assessment Environment can include various classes for performing the simulation and assessment. Example classes are presented in FIGS. 27A-27B. Specific implementations can use all, some or none of these example classes. The particular example presented in FIGS. 27A-27B can be used for a two-dimensional game play.

The systems and methods described herein can be used to assess the performance of candidates for management roles, including project management. For such measurement, the system could be configured according to the example illustrated in FIGS. 28A-28F, including some or all of the components of Configure Simulation, Monitor Dashboard, Drill-Down and Make Decisions, Make Team-Level Decisions, Make Individual-Level Decisions, and/or Evaluate Results. The parameters in FIGS. 28A-28F are examples and implementations can vary according to the parameters used as well as the ordering of parameters. Some embodiments may not use all of the parameters illustrated and others may use other or additional parameters not illustrated.

Figure 29:
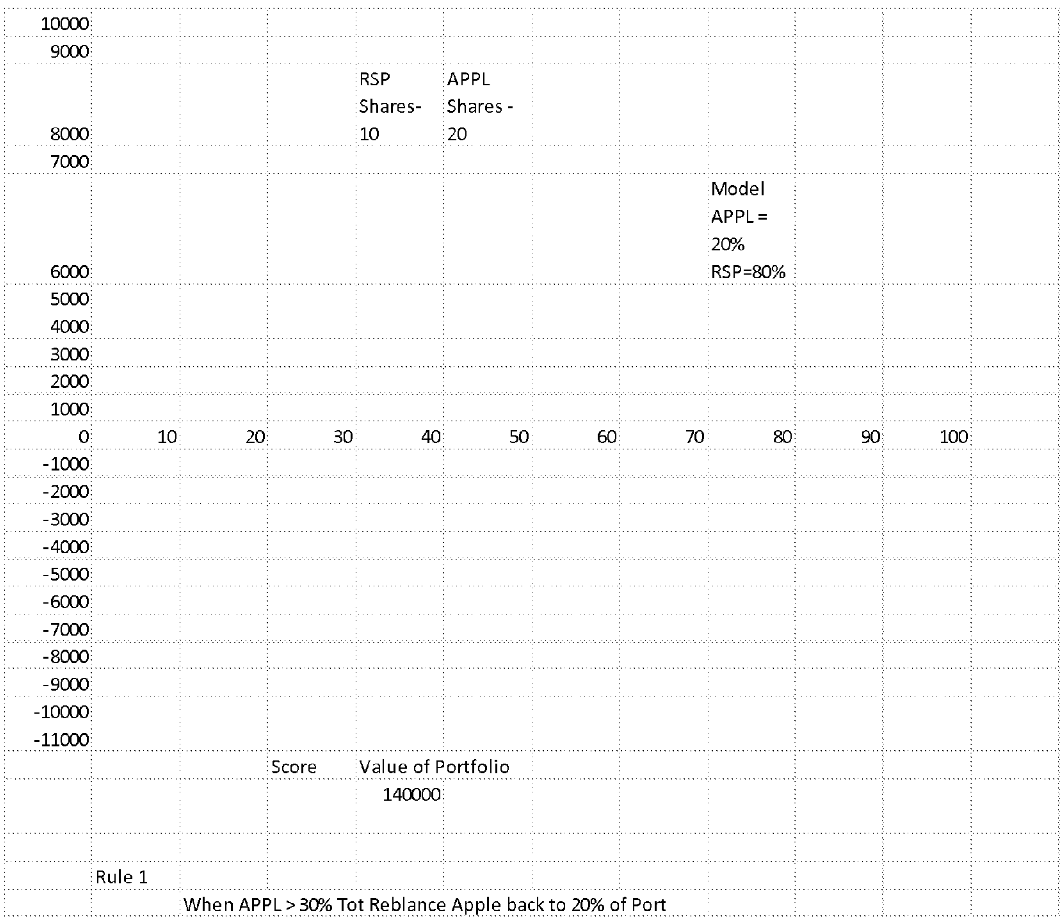
FIG. 29 illustrates an example simulation for trading in a financial market.

The systems described herein can be used to simulate trading in a financial market. For example, the system can be configured to model the movement of stock prices. The system can present candidates with various stocks at various prices. The system can then update the prices of the stocks and monitor how the candidate rebalances the portfolio based on those updated prices. In the example illustrated in FIG. 29, the vertical axis represents a value, such as a share of a stock. This assessment can be performed using some or all of the features of the game simulation. Stocks can be tracked in the same or a corresponding manner as games pieces in the example games described herein. While the example in FIG. 29 is two-dimensional, multi-dimensional variations are possible. In some embodiments, the third dimension could be time, such as a calendar.

Figure 31:
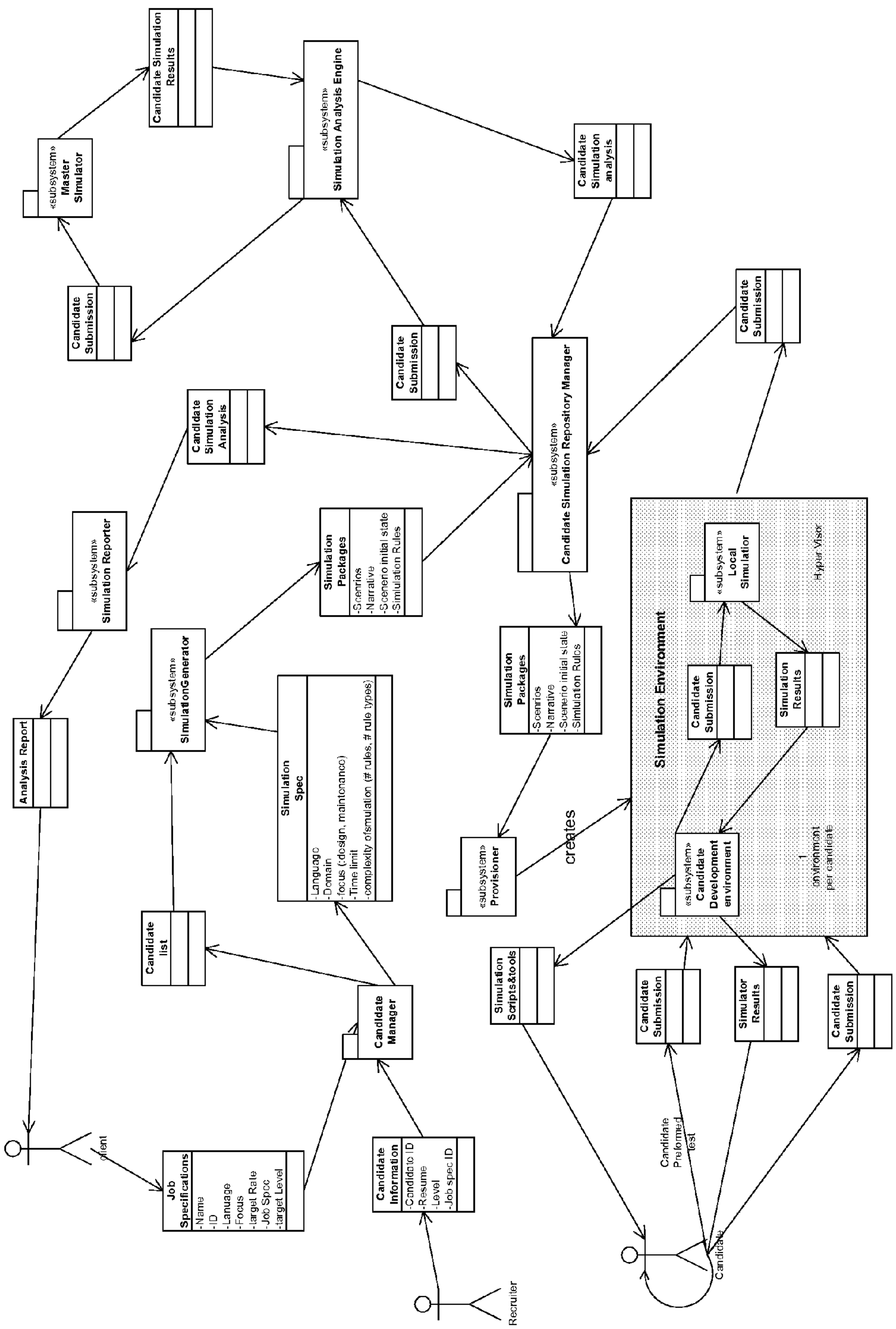

An example process flow for an example use case is described in FIG. 30 and illustrated in FIG. 31. Not all of these steps are performed by every embodiment.

Digital Signature Analysis: Overview

On a candidate level, the digital signature analysis component can be used to produce a characteristic digital signature, which can considered to be similar to a unique fingerprint of a candidate's competency within the discipline and/or domain within which the candidate has been assessed. As described in more detail below, the digital signature can be used for relative comparison of candidates.

The system can also generate various metrics based on the results of the simulation. Some or all of these metrics can be considered as part of a candidate signature. In some embodiments, the individual metrics can be mathematically processed so as to generate a single number, such as a weighted distance between candidate competencies. In general, any appropriate metrics scheme could be used for qualitatively or quantitatively assessing the candidate solution.

Once the metrics have been collected from multiple candidates, various searching and sorting can be performed on the set of candidates. For example, thresholds could be used to select those candidates having a certain range of values on one or more metrics.

An analyzer can be used to identify certain metrics of specifically identified candidates. For example, if an existing candidate is identified as having certain metrics, the Analyzer can be used to identify candidates having similar metrics. The system can receive, as inputs from a user, specific metrics on which to search for candidates. The analyzer can then identify candidates matching the input metrics within a specified tolerance range on the metrics.

In other embodiments, the input can be metrics describing an existing candidate. The metrics describing the existing candidate can be derived from the candidate taking an assessment and recording the results of that assessment. Those metrics can be designated as a target metric set. An analyzer can then search for candidates having metrics which correlate with the target metric set. In some embodiments, the user can specify correlation by, for example, setting upper or lower bounds or equality conditions.

Candidate signatures may also be aggregated to generate signatures for related groups of candidates (e.g. to characterize a team of QA engineers).

Signature: Definition

As discussed above, an exercise for a candidate can be, as non-limiting examples, any combination of a simple questionnaire, an adaptive questionnaire, an analysis simulation, a development simulation, database simulation or other simulation. As further non-limiting examples, the development simulations can include C# development simulations, Java development simulations, or other technology-specific simulations (such as SQL).

The signature created by the system can be a mathematical representation of the candidate's results created by performing a specific version of an exercise. A signature can include the attributes which incorporate or represent the data used by the mathematical representation. As non-limiting examples, signature attributes from a development simulation signature might include Exercise ID, Owner ID, Time Taken, and the data points extracted from a code analysis tool.

A composite signature can be created by taking the logical weighted distance or superposition its component signatures.

A user of the system can have access to inspect stored signatures. In some embodiments, a user can access signature data and graphically visualize all of its components. In other embodiments, the user can be limited to accessing the signatures for use in a function such as search or compare. For example, users can be configured to be able to choose and use signatures as benchmarks to search for, filter, match and compare with other signatures. A signature stored in the system can be a mathematical representation of problem solving techniques and can be used in logical and mathematical operations including, as non-limiting examples, searching and sorting.

Signature: Information Capture Functions

The signature can be configured to represent or include mathematical and/or quantitative information directly and/or indirectly representing a candidate's ability to perform in several domains. As non-limiting examples, the domains may include:

Problem Analysis: The refinement of a problem statement with the objectives of improving its quality (removing errors, omissions, and inconsistencies) and deepening understanding to a level where solution options can be identified, elaborated and evaluated.

Abstraction Selection: The selection of a set of abstractions (general and specific) that determine the structural design of solution candidates.

Algorithm Selection: The selection of a set of algorithms that determine the behavioral design of solution candidates.

Solution Selection: The analysis of a set of candidate solutions with the objective of selecting the solution that best solves the problem at hand.

Solution Realization: The development of a solution to the problem by transforming the selected solution into an executable implementation.

Solution Evolution: The evolution of a solution to incorporate new or updated requirements of the problem being solved.

Solution Generalization: The generalization of a solution with the objective of applying some or all of the solution to other problems.

Signature Component Overview

To aid in mapping from activities to a signature, the signature can be decomposed into, as a non-limiting example, five metrics. The signature metrics can be derived from detailed metrics gathered from the results of an exercise a candidate takes. The signature metrics can be selected and designed so as to accomplish one or more of the information capture functions described above. As non-limiting examples, the metrics can include:

Functional Accuracy: The degree to which a solution delivered by a candidate correctly implements required functionality. The functional accuracy metric can be a measure of the degree to which a solution meets the functional requirements of a user story. In some embodiments of the simulator, a solution can be run for a configured number of clock ticks. For each tick, if the output of the solution matches the output of the simulator, the solution is considered functionally correct.

Functional accuracy can be calculated as the ratio of the number of functionally correct ticks to the total number of ticks.

For example, let:

FA=Functional Accuracy for User Story

T=Number of ticks for user story

C=Number of ticks where the user's solution is functionally correct.

Then:

$$FA=C/T$$

Design Characteristics: A measure of the features inherent in the candidate's solution design.

Solution Complexity: A measure of how complex a candidate's solution is.

Solution Volume: A measure derived from volumetric data extracted from the candidate's solution (e.g. number of classes, lines of code etc.)

For example, let:

SV=Solution Volume

L=Number of lines of code in the solution

A=Number of abstractions in the solution

C=Number of classes (abstract and concrete) in the solution

I=Number of interfaces in the solution

Then:

$$SV=L/A$$

$$A=C+I$$

Effort: A measure of the effort taken to complete the exercise.

For example, let:

DE=Development Effort

S=Start time of user story development

F=Finish time of user story development

Then:

$$DE=F-S$$

An exercise type is a composite of one or more of a questionnaire, an analysis simulation, and/or a developer simulation. The signature for an exercise can be derived from the signatures of one or more child elements. Relevant signature metrics can be derived for these elements and can be combined into an aggregate signature for the associated exercise type.

Signature Comparison

Figure 32:
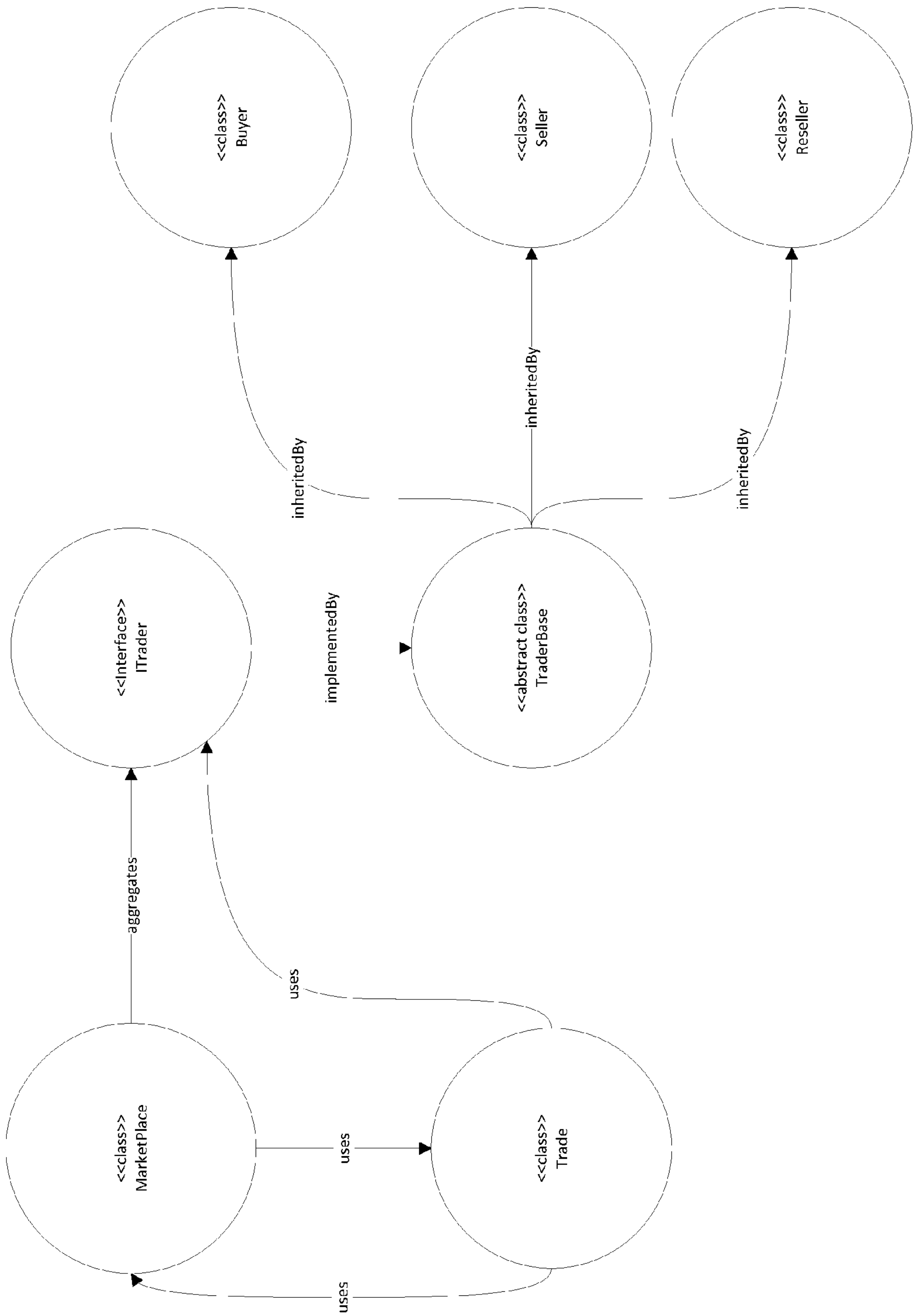
FIG. 32 illustrates an example graph of a fragment of a solution.

With reference to FIG. 32, the graph illustrates a fragment of the solution submitted as part of a development simulation. The vertices (circles) represent classes and the edges (arrows between classes) represent relationships between classes. A similar graph could be drawn where the vertices are methods and the edges are the calling relationships between methods. Each vertex (class/method) has a set of metrics associated with it. Some metrics are indirectly dependent on the edges associated with a vertex (e.g., complexity). Other metrics are strongly dependent on the presence of edges (e.g. coupling between objects).

Edges may have attributes. Their presence or absence can indicate a relationship between the associated vertices. Vertices and edges can be typed. In graphs, the Unified Modeling Language (UML) stereotype notation identifies the vertex type and the label on an edge identifies the edge type. Typing vertices and edges enables inspection of graphs of different type combinations to gain insight on different aspects of a candidate's thought process. For example, the inheritance edges between interfaces and classes provide information about the degree to which a solution exhibits evidence of being an O-O solution.

Figure 33:
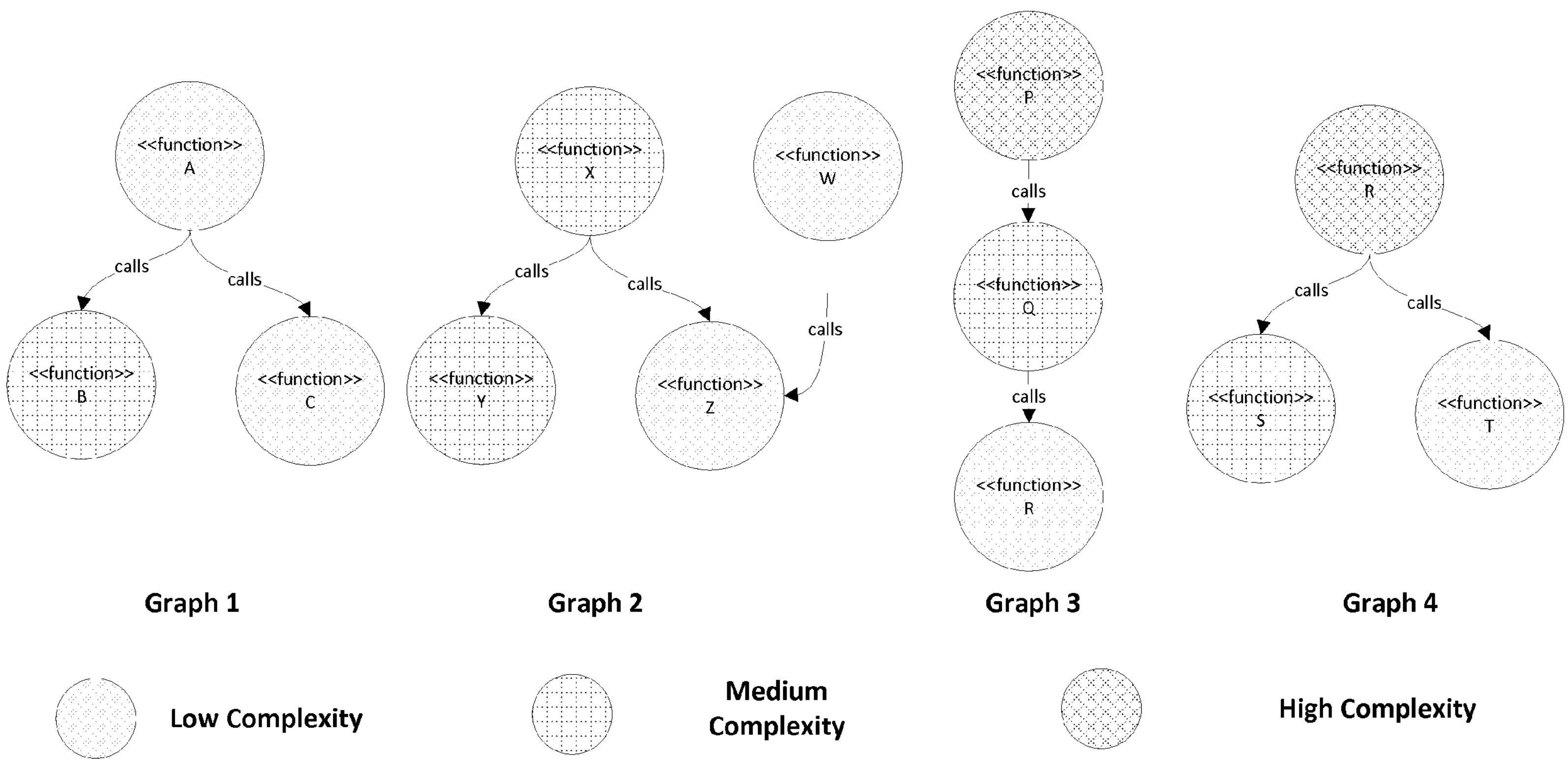
FIG. 33 illustrates an example representation of function complexity.
Figure 34:
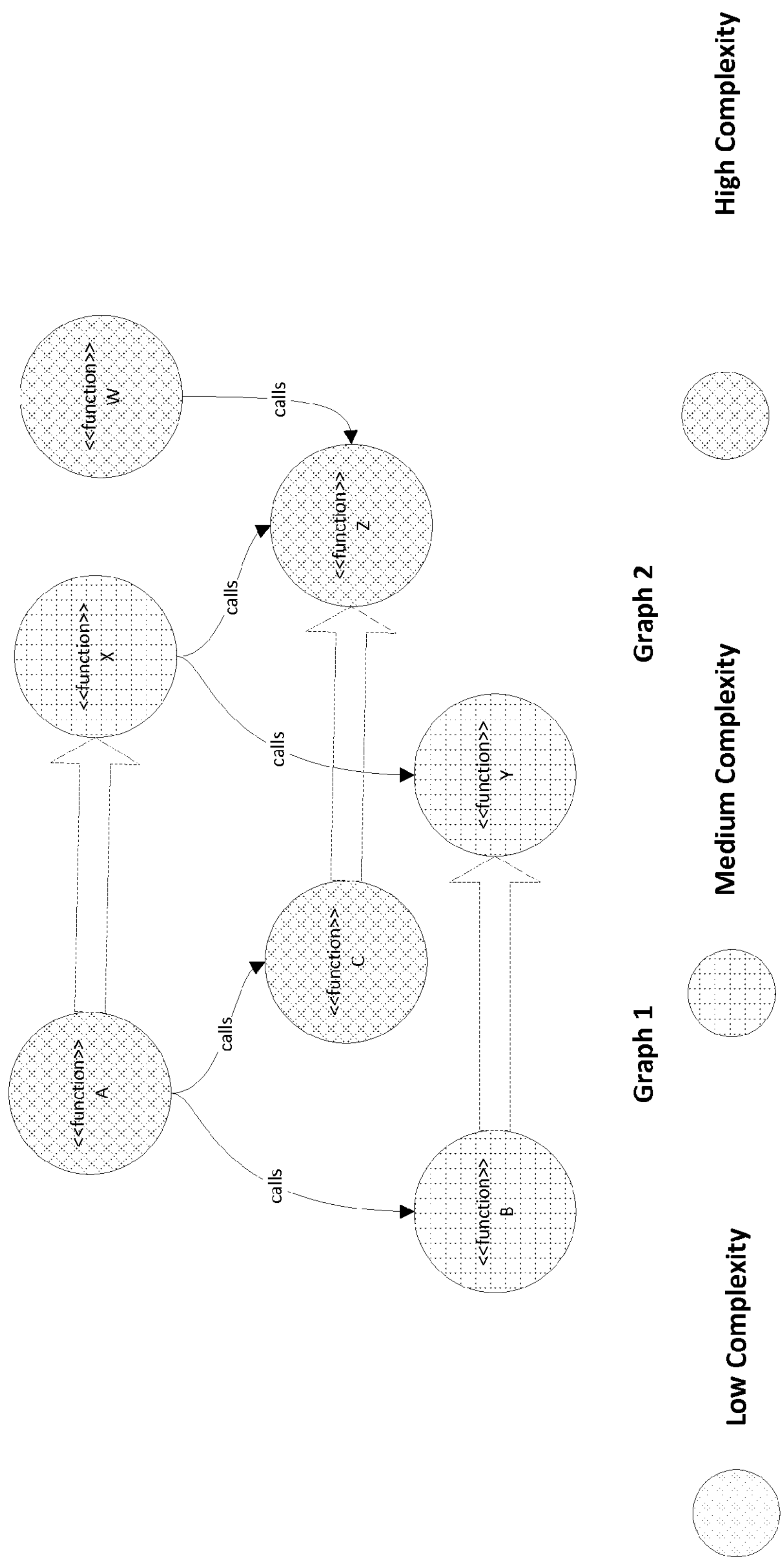
FIG. 34 illustrates an example comparison of two graphs for similarity.

In FIG. 33, complexity of the functions is illustrated by shading. Based on complexity, it may appear that graphs 1 and 2 are the most similar because the function at the top in graph 4 is further in complexity from the top function in graph 1. Such a conclusion would require stating that the functions in graphs 1 and 2 could be grouped as illustrated in FIG. 34. In FIG. 34, the block arrows denote new edges between the vertices in different graphs where the type of the edge is "similar to". The actual functions implemented in functions A and X may not be the same; rather their corresponding signatures may be the most similar. As a non-limiting example, signature comparison can be performed by comparing of a number of graphs for similarity.

At least two categories of data can be used in the creation and comparison of signatures. As non-limiting examples, these categories can include metrics related to the nodes in a graph and metrics related to the edges in a graph. Examples of metrics related to the nodes in a graph can include the number of classes, abstract classes, and interfaces in a solution, the number of public, protected, and private member functions in a class, and/or the number of polymorphic calls as a ratio of the total number of calls made by a class. Examples of metrics related to the edges in a graph can include the set of child classes and interfaces a class inherits from, and/or the set of methods called by a member function.

A node can be characterized by a number of metrics which may be expressed as a vector or as a single value. Some metrics may or may not have a vector form.

Signature Comparison: Distance

Signatures can be related to each other by a mathematical distance relationship. The vector form of node metrics can be compared using a distance comparison from a reference vector of node metrics. As a non-limiting example, distance can be calculated as the Euclidean distance between a set of vectors and a reference vector.

For example, given the two vectors:

$$xA=(xA0,xA1) \text{ and } xB=(xB0,xB1)$$

Then, the distance between the two vectors could be calculated as:

$$d=SQRT((xA0-xB0)^2+(xA1-xB1)^2)$$

This could be a vector where the dimensions are the number of classes, the number of abstract classes, and/or the number of interfaces. This distance calculation can be extended to an arbitrary number of dimensions. The distance calculation can be used as the basis for clustering algorithms, such as k-nearest neighbors and k-means clustering.

Signature Comparison: Distribution Comparison

In some cases, a vector form of a metric can represent a probability distribution which can be illustrated as a histogram. The signature comparison algorithm can be used to determine the degree of similarity between a set of probability distributions and a reference distribution.

As non-limiting examples, the Euclidean distance described above (referred to as the Quadratic Form Distance in this context) can be used. The Chi-Squared distance can also be used. This approach can reduce the effect of the difference between large probability distributions and emphasize the difference between smaller distributions. Given two probability distributions (P,Q) the Chi-Squared Distance (CSD) is:

$$CSD=0.5\times SUM((P_i-Q_i)\hat{}2/(P_i+Q_i))$$

The Earth Movers Distance (EMD) algorithm can be used as a histogram comparison technique. The effort needed turn one pile of earth into the other is a measure of the degree of difference between the two histograms.

Signature Comparison: Graph Similarity

As described above, graphs can be compared for the degree of similarity between them using any of a number of graph similarity algorithms. As a non-limiting example, the signature comparison algorithm can be formally represented as follows below.

The type of an exercise (questionnaire, requirements analysis simulation, and developer simulation) can be used to determine the vertex and edge types:

$V_x=\{V_0,V_1,V_2, \ldots V_{n-1}\}$=set of vertex types $E_{xy}=\{E_{01},E_{02},E_{10},E_{12}, \ldots E_{n-1\ m-1}\}$=set of edge types between vertices of type x and y $M_{vx}=\{M_{v0},M_{v1},M_{v2}, \ldots M_{vn-1}\}$=set of metrics for vertex type x $M_{ex}=\{M_{e0},M_{e1}, M_{e2}, \ldots M_{en-1}\}$=set of metrics for vertex type e For any solution S:

$S_v=\{Sv_0,Sv_1,Sv_2 \ldots Sv_n\}$=set of vertices in solution S $S_e=\{Se_0,Se_1,Se_2 \ldots Se_n\}$=set of edges in solution S The similarity between solutions S1 and S2 (T) is:

$$T_{12}=w_0T_g(S_1,S_2)+w_1T_m(S_1,S_2)$$

Where:

$T_g$ is the similarity based on comparing graphs, and $T_m$ is the similarity based on comparing vertex metrics.

Signature: Object-Oriented Example

As a non-limiting example, for object-oriented languages, how object-oriented a candidate solution is can be measured. Relevant metrics related to object orientation principles can represent:

Encapsulation: The placing of data and behavior within an abstraction (e.g. class) in order to hide design decisions and expose only those features needed by consumers.

Inheritance: The mechanism by which one abstraction acquires the features (e.g., fields, properties, and operations) of other classes.

Polymorphism: The ability to use the same name for different actions on objects of different types. In C# and Java this is achieved through interface implementation and virtual functions.

The relevant metrics can be grouped into broad categories, including, for example:

Abstraction Metrics: These metrics relate to the types of things that were used. These metrics can include:

Use of types abstraction as a measure of the diversity of different abstraction types (e.g. Interfaces, Abstract Classes, Classes etc.) in the solution design;

Feature count distribution as a measurement of the variability of the size of abstractions in the solution design as measured by the number of features an abstraction has;

Blend of class and instance features as a measure of the extent to which a solution design uses a blend of class (static) and instance features;

Control of static feature visibility metric as a measure of the degree to which the visibility of static features from the perspective of using classes is designed into the solution;

Control of feature visibility metric as a measure of the degree to which the visibility of instance features from the perspective of using classes is designed into the solution; and Encapsulation index as a measure of the degree to which a solution exhibits evidence of the use of abstract data types in its design.

Complexity Metrics: These metrics relate to the functional characteristics of the abstractions in a solution. From a graph perspective, these metrics relate to the nodes in an abstraction graph or member function graph. These metrics can include complexity distribution as a measure of how the complexity of the solution is distributed across solution abstractions.

Inheritance Metrics: These metrics relate to the inheritance structures in a solution design. These metrics can include:

Inheritance index as a measure of the degree to which a solution design exhibits evidence of the use of inheritance to create specializations from other abstractions;

Polymorphism index as a measure of the degree to which a solution exhibits evidence of using polymorphism in its design;

Inheritance tree similarity metric as a measure of the degree of similarity between the inheritance tree(s) in a solution design and the inheritance tree(s) in a reference solution design; and Inheritance tree transformation effort as a measure of the effort required to transform an inheritance tree into a reference inheritance tree.

Collaboration Metrics: These metrics relate to the collaboration relationships between abstractions both in terms of how an abstraction contains/aggregates another and the calling relationships between abstractions. These metrics can include:

Property usage metric as a measure of the extent to which abstractions in the solution design are used as property types by other abstractions (i.e. participating in containment or aggregation relationships);

API coupling metric as a measure of the degree to which Simulator types are coupled to developer abstractions; and Call graph similarity metric as a measure of the similarity of the caller/called patterns in a solution design with the caller/called patterns in a reference solution design.

Signatures can be generated at multiple steps during the candidate evaluation progress and a composite signature can be ultimately generated. Individual intermediate signatures can be combined into an overall candidate signature. The composite signature, as well as the intermediate signatures, can be used in one or more distance calculations for comparative purposes. Any of the metrics can be represented as vectors of values that can, optionally, be converted into a single value (for example, by calculating the length of the vector). In some cases, individual values of a vector or the single value of a metric can be normalized to be within a defined range to enable comparison between different sets of metrics. This can be performed using a normalization function which takes as parameters the minimum and maximum of a new range and the vector of values or a single value to scale within that range. As a non-limiting example, a metric can be normalized to be within the range 0 . . . 1.

User Profiles

The system can be configured to support multiple levels of access. As non-limiting examples, user access levels can include public, private, and/or corporate. Exercises, exercise results, signatures and user profiles can be considered assets created by the results of the exercises that a candidate takes. These assets can be made accessible by entitlement settings that are set by the access level of system membership and/or the user's relationship to the platform.

The results of assessments can be stored in connection with a user profile. The assessments can be characterized in the system as public, private, and/or corporate. Assessment visibilities can be controlled based on the status of the candidate and/or the status of the viewer user, as public, private or corporate. In some cases, the creator of the assessment can be granted privileges to control distribution of the results and their designation as public, private, or corporate. Any candidate can be associated with a corresponding user profile. The user profile can include any other arbitrary data about a candidate, the other data being referred to as profile characteristics. As non-limiting examples, user profile characteristics can include cost of a candidate (e.g., salary), job volatility (e.g., average tenure in a job), years of experience, and/or designated skills.

Candidate Search Functionality

The system can include capabilities for performing sophisticated candidate identification and matching procedures. Example procedures are described below.

Benchmark Definition

The assessments made available in the system can be taken by candidates and those results defined as a benchmark result (also referred to as a benchmark solution). The benchmark result can be associated with a signature, as can any other result, as described above. These benchmark results and signatures can then be used as a base point of comparison for other candidates in the system. For example, a company may identify a certain employee as having a particularly desirable skillset or being particularly effective based on objective or subjective criteria. That candidate can take one or more assessments available in the CAS. The results of that assessment, including any signatures created as a result, can be stored as a benchmark result and the candidate having taken the assessment can be designated as a benchmark candidate with respect to that assessment. As described in more detail below, subsequent searching can be performed based on a comparison of other candidates to the benchmark result.

For example, the CAS can include functions that enable matching individual benchmarks to pre-defined company criteria. A corporate user can identify a benchmark result as a target for other users in the system. A position within a company can be defined based on one or more benchmarks. A job sponsor can provide a signature of the job offering. The system can then enable a user to search for jobs based on the user's own signature and the target benchmark. The system can also include an interface for comparing to a benchmark based on the signature.

Specific assessments can be made accessible through a hypertext link. The system can be configured to allow a corporate user to send private links which are active during a certain time window to potential candidates. In some embodiments, the system can include a scheduler for sending hypertext links to candidates during predetermined time windows.

Candidate Research Portal

The system can be configured so that searching can be performed based on benchmarks and/or exercise results. The results of assessments can be presented in terms of distance from either each other or from one or more other benchmarks. The system can represent multiple relative distances between benchmarks.

Assessment results can be presented based on a rank with respect to other assessment results and distances from other assessment results. Rank can be relative to the population that took that exercise and optionally met other specified criteria. Assessment results can be pre-filtered for one or more criteria before comparison to other results. Thus, rank can be calculated with respect to a subpopulation for the same benchmark or class of benchmarks.

Filtering can be performed based on exercise rank in combination with one or more arbitrary dimensions. As a non-limiting example, filtering can be performed based on candidate characteristics (e.g., user profile characteristics) such as the cost of a candidate (e.g., salary), job volatility (e.g., average tenure in a job), years of experience, and/or designated skills. Thus, exercise rank can be assessed in combination with multi-dimensional criteria.

Candidate assessment data can be presented graphically using a variety of approaches, such as those illustrated in FIGS. 35-40C. In the examples of FIGS. 35-40C, candidate results and benchmarks can be presented using candlestick or candlestick-like charts. Other forms of bar charts and box plots could also be used, as could any other graphical representation. In the illustrated example, characteristics of benchmark candidates can be presented along the x-axis, grouped by benchmark candidate. In the example illustrated in FIG. 35, sample characteristics of benchmark candidates are presented. One or more user-selected characteristics can be presented with respect to the benchmark candidate. The actual values of the characteristics for the benchmark candidates are set in the plot as the baseline 0% line. In the example chart, the range for the different characteristics can be represented with respect to −100 to +100% of the baseline, with the baseline at zero. Other larger or smaller ranges could be used. This approach can display the range between highest and lowest characteristic values.

Figure 35:
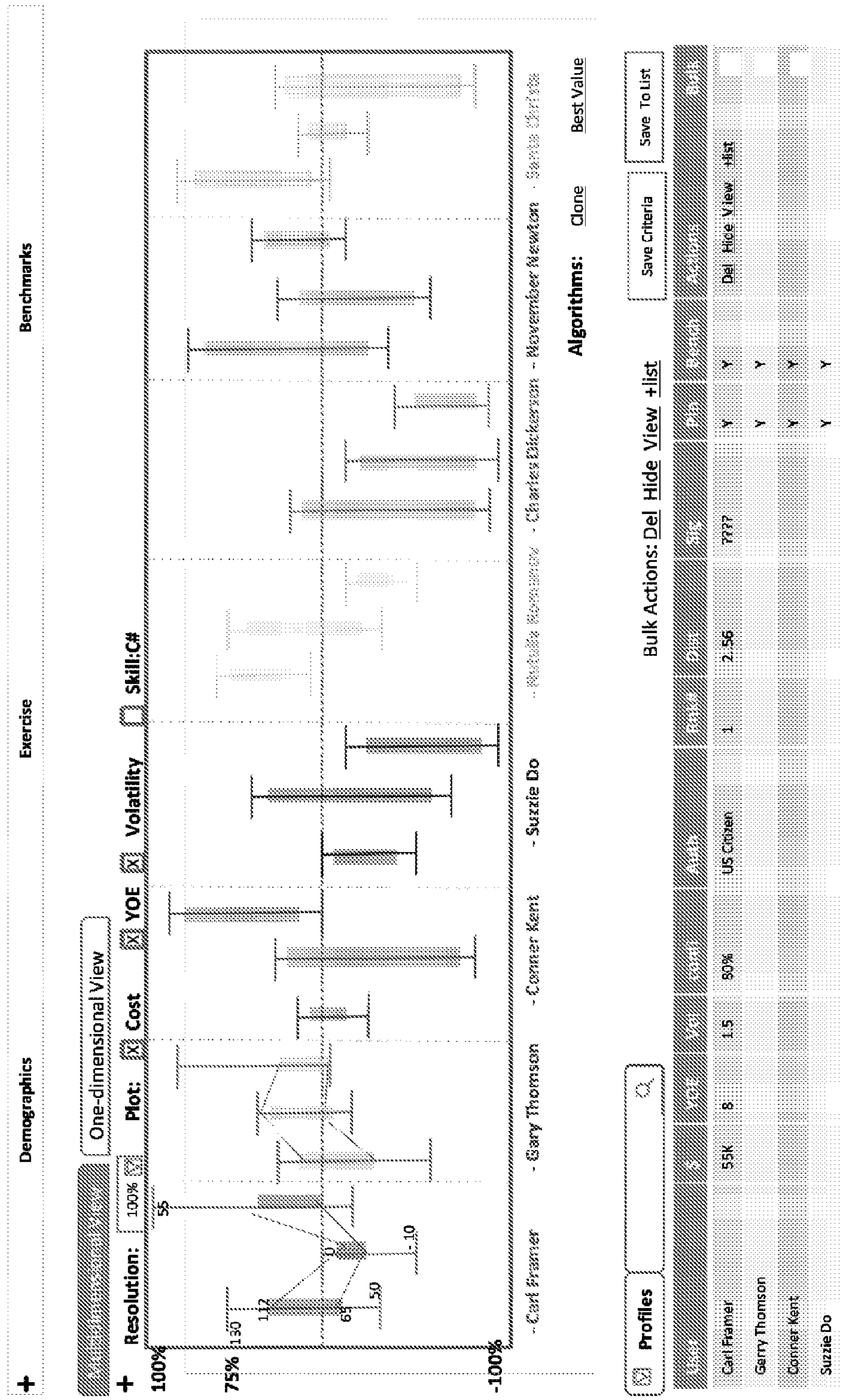
FIGS. 35-40C illustrate example graphical presentations of candidate assessment data.
Figure 36:
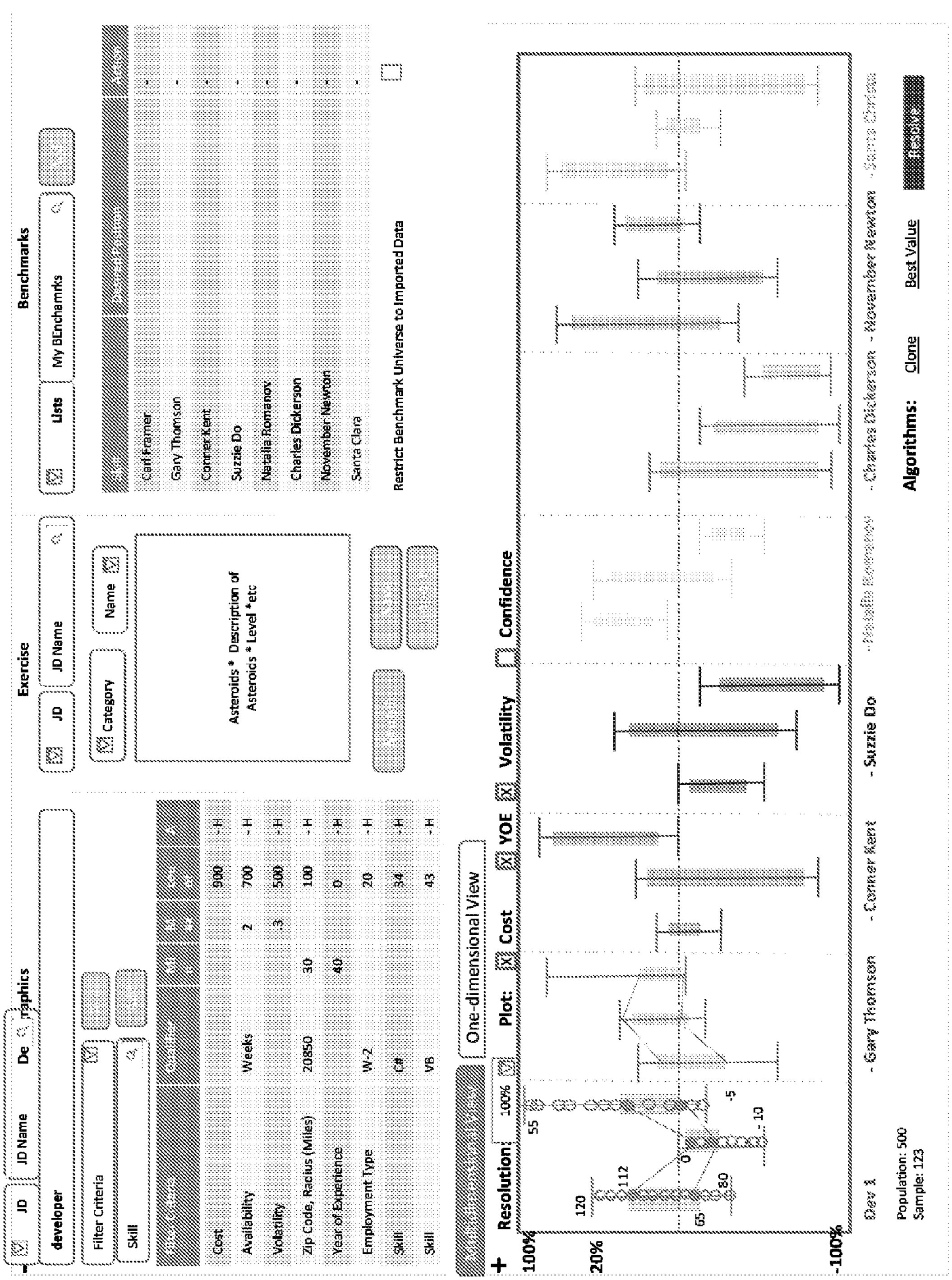
Figure 37:
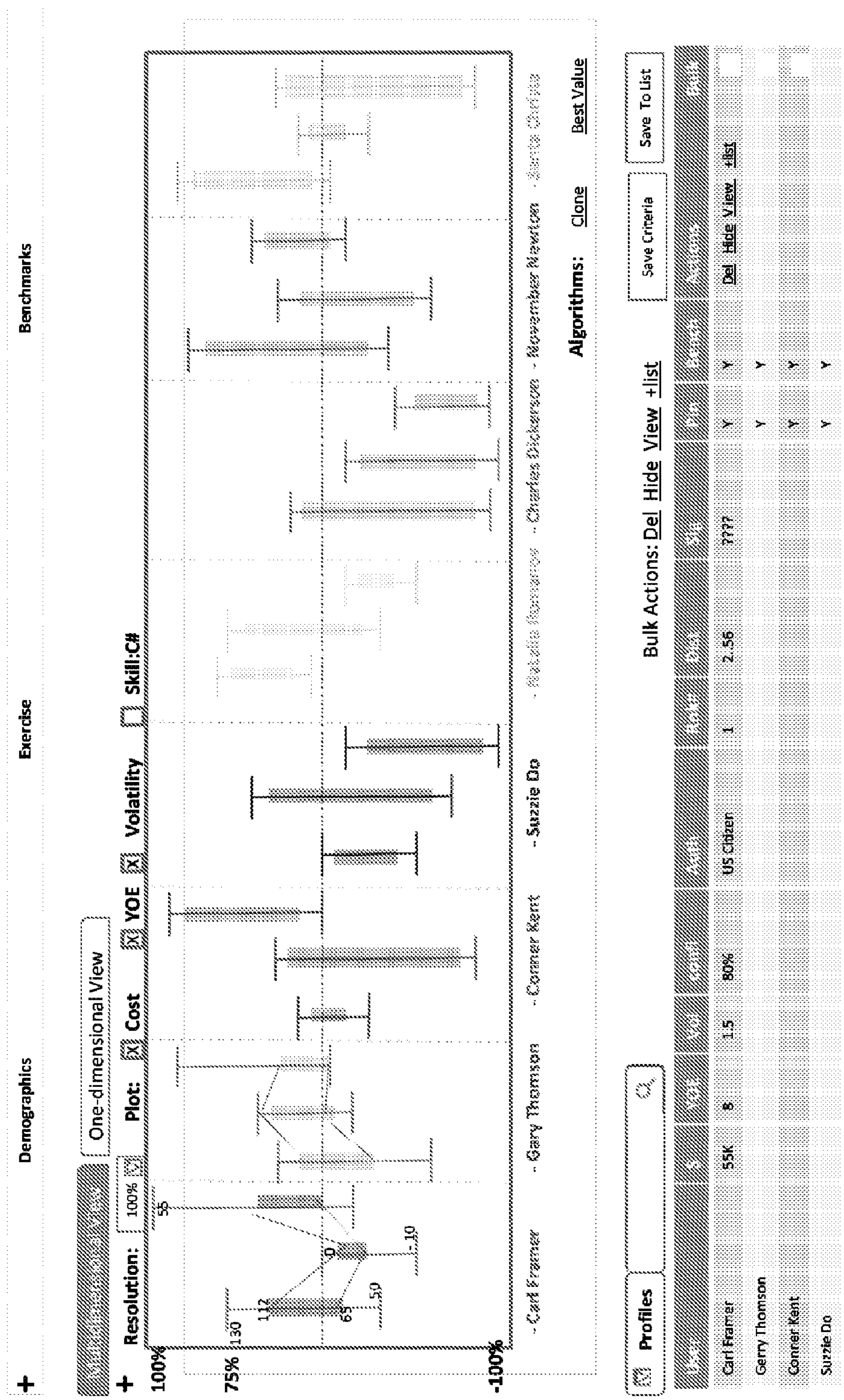

As illustrated in FIG. 35, the global candidate maximum and minimum for a given characteristic are represented by the ends of the t-bars. After filtering based on user-specified characteristics, the candidate set may be reduced to a subset of all candidates. The characteristics for this subset of candidates are presented using the darkened band inside of the t-bars in FIG. 35. In the example of Carl Framer, the global maximum for cost of all candidates was 130% of the baseline and the minimum was −50%. After filtering based on one or more user-specified characteristics, the maximum cost characteristic for the subset was 112% and the minimum was −35% (65). The system can be configured to draw one or more lines between the characteristics for a single candidate to illustrate a set of characteristics belonging to a single candidate. The number of characteristics displayed can be toggled, as can the selection of the specific characteristics being displayed.

The system can be configured so that arbitrary graphical elements can be selectable based on user input. For example, with reference to FIG. 36, a user selection of a data point associated with a candidate can cause the display to indicate or highlight all of the data points for characteristics associated with that user.

The system can be configured to include plot functionality with scalar ranges. For the plots, for each benchmark with a band (or range) having been established, the system can identify the intersection of the candidates across the bands to identify a population of candidates. Ranks can then be calculated for that set of candidates using the characteristics within the band and the exercise rank or distance. The system can then display in a grid of the union of the results of this calculation across multiple benchmark populations. The output can also be sorted based on various characteristics, ranks or distances.

Figure 38:
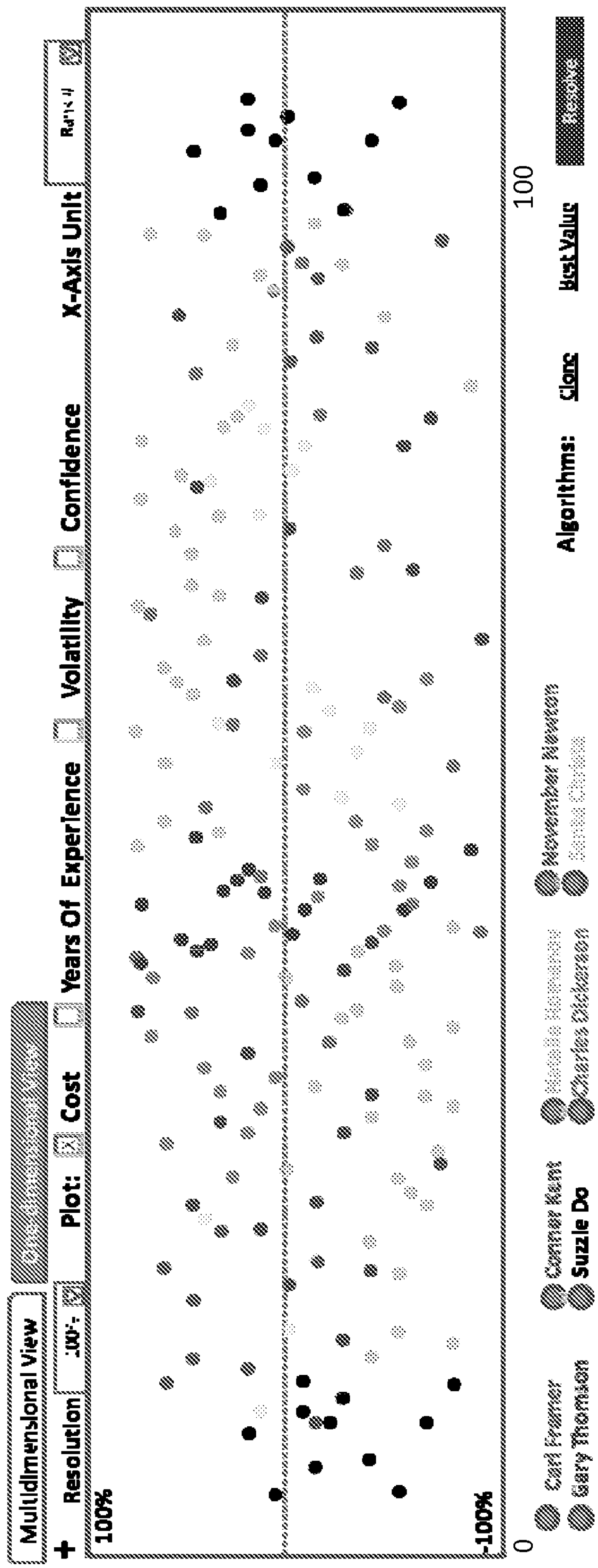
Figure 39:
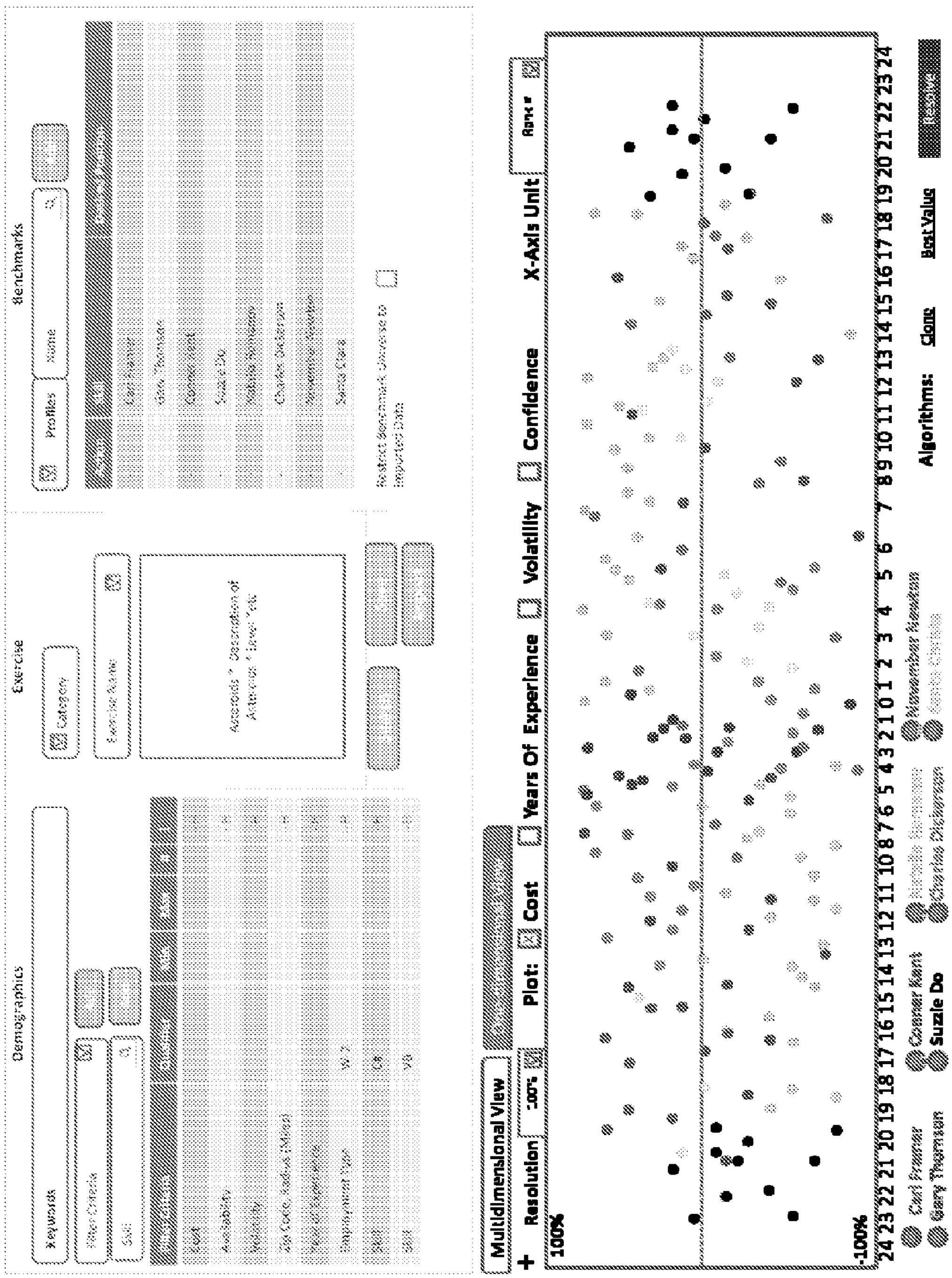
Figure 40A:
Figure 40B:
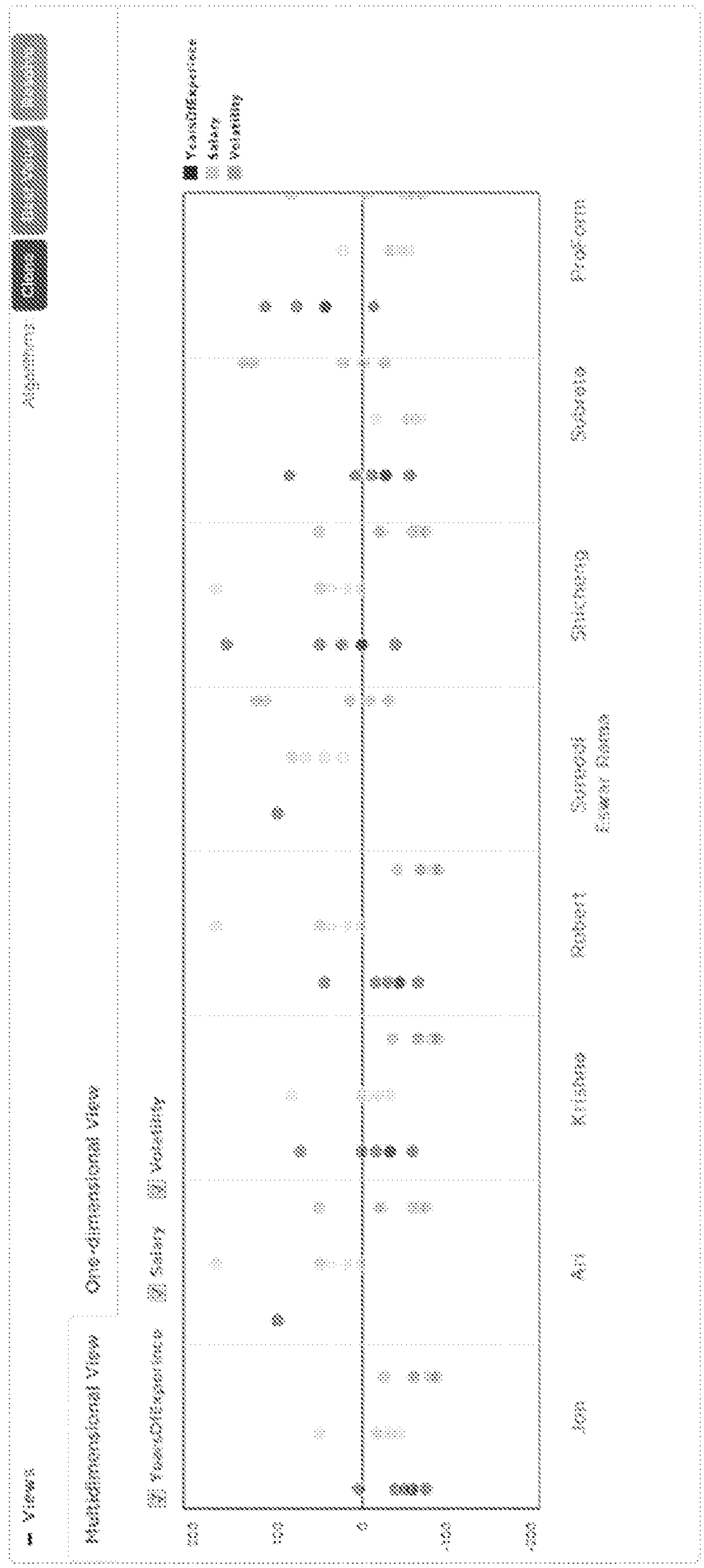
Figure 40C:
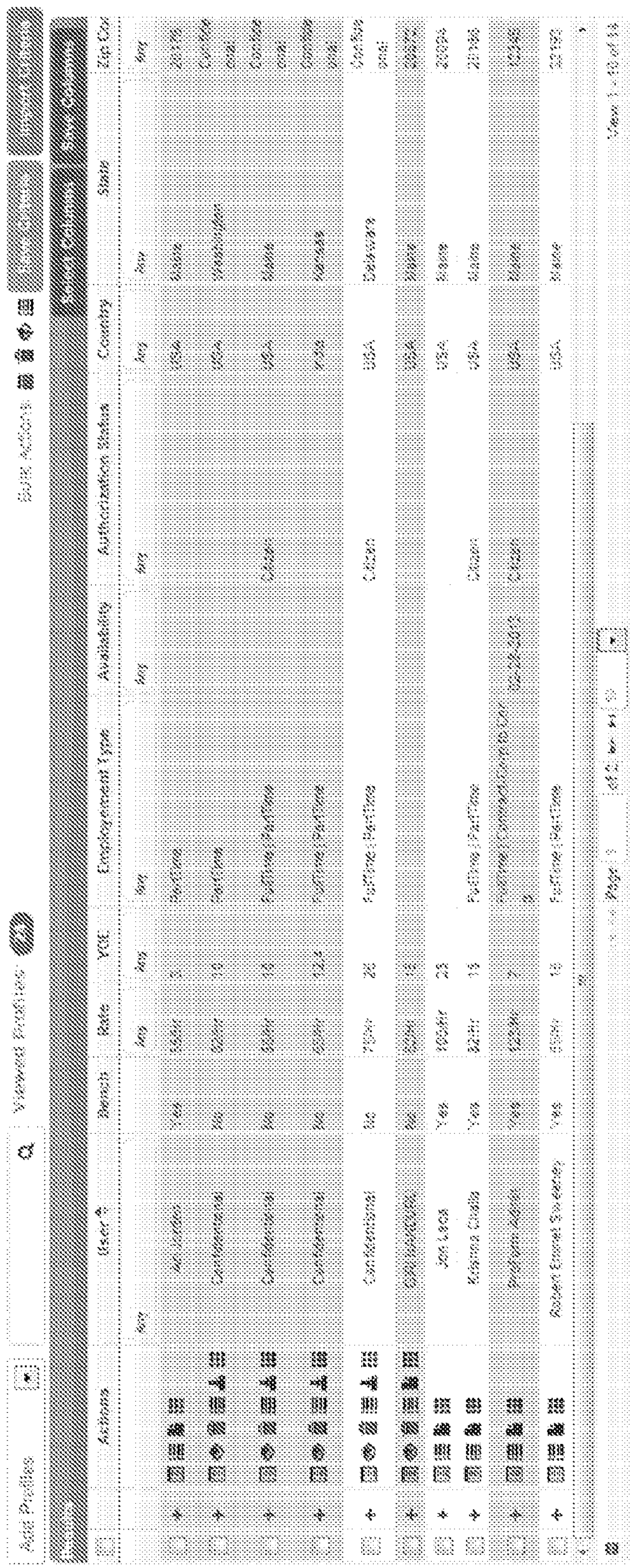

Additional representations of the data are possible. For example, as illustrated in FIGS. 38-39, a scatter plot can be used to show benchmarks at a midpoint of 0 on the y axis, and candidate rank or distance on x axis. In the illustrated example, the y axis can represent a user-selected characteristic (such as, for example, candidate cost, years of experience, etc.) and the x axis can represent rank or distance of candidate results from a benchmark result. This representation of the data can be used to illustrate clustering of candidate results and provide a visual illustration of the rank or distance.

The system can be configured to support clone functionality. The clone functionality can be configured based on a spread around the benchmarks and characteristics of a specific user candidate or benchmark candidate to identify one or more other users within the spread from the specified user. The system can include functions for identifying the closest and farthest benchmarks and characteristics for comparison. The system can also be configured to identify the best value candidate. The best value candidate can be a user candidate being optimized for a financial cost characteristic.

For example, the system can be configured to receive an identification of a benchmark candidate, receive a selection of a set of profile characteristics associated with the identified benchmark candidate, and receive an identification of a range for values of the selected profile characteristics, the range defining a percentage deviation above and below the values of the characteristics associated with the identified benchmark candidate. The system can be configured to then identify one or more user candidates having associated profile characteristics within the defined percentage deviation from the identified benchmark candidate for all of the selected profile characteristics.

The system can also be configured to receive an identification of a range for values of the profile characteristics, the range defining a percentage deviation above for a years of experience profile characteristic, below for a volatility profile characteristic, and below for a cost profile characteristic with respect to the values of those characteristics associated with benchmark candidate. The system can be configured to then identify one or more user candidates having associated profile characteristics within the defined percentage deviation from the benchmark candidate for years of experience, volatility, and cost profile characteristics.

The system can also be configured to receive an identification of a range for values of the profile characteristics, the range defining a percentage deviation above and below the values of the characteristics associated with the benchmark candidate. The system can be configured to then identify one or more user candidates having both associated profile characteristics within the defined percentage deviation from the benchmark candidate and the comparatively greatest mathematical distance between the corresponding user candidate digital signatures and the digital signature corresponding to the benchmark candidate.

System Architectures

The systems and methods described herein can be implemented in software or hardware or any combination thereof. The systems and methods described herein can be implemented using one or more computing devices which may or may not be physically or logically separate from each other. Additionally, various aspects of the methods described herein may be combined or merged into other functions.

A non-limiting example logical system architecture for implementing the disclosed systems and methods is illustrated in FIGS. 1-4. In some embodiments, the illustrated system elements could be combined into a single hardware device or separated into multiple hardware devices. If multiple hardware devices are used, the hardware devices could be physically located proximate to or remotely from each other.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as a CRT (cathode ray tube), LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as Flash™, JAVA™, C++, C, C#, Visual Basic™, JavaScript™, PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, IOS™, Unix™/X-Windows™, Linux™, etc.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The systems, modules, and methods described herein can be implemented using any combination of software or hardware elements. The systems, modules, and methods described herein can be implemented using one or more virtual machines operating alone or in combination with each other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

While one or more embodiments of the invention have been described, various alterations, additions, permutations and equivalents thereof are included within the scope of the invention.

What is claimed is:

1. A computerized method for comparing the skills and capabilities of a candidate, the method comprising:

electronically storing a plurality of candidate assessments for assessing one or more user candidates in a computerized data storage device;

receiving an identification of a selected assessment from the computerized data storage device;

provisioning a first candidate assessment workspace including the selected assessment for administration to a first user candidate;

electronically recording decisions input by the first user candidate while the first user candidate is operating within the first candidate assessment workspace, wherein the decisions are represented by a plurality of states, including at least one intermediate state, the states representing a sequence of inputs into the first candidate assessment workspace;

provisioning a second candidate assessment workspace including the selected assessment for administration to a second user candidate;

electronically recording decisions made by the second user candidate while the second user candidate is operating within the second candidate assessment workspace, wherein the decisions are represented by a plurality of states, including at least one intermediate state, the states representing a sequence of inputs into the second candidate assessment workspace;

calculating by a processor device:

an intermediate comparison between at least one of the recorded decisions made by the first user candidate and at least one of the recorded decisions made by the second user candidate, the comparison based on a difference between the at least one recorded intermediate state of the first user candidate assessment and the at least one recorded intermediate state of the second user candidate assessment, the intermediate states being the results of intermediate decisions input by the first user candidate and the second user candidate while operating within the candidate assessment before the assessment is completed; and electronically storing the intermediate comparison on the computerized data storage device.

2. The method of claim 1, further comprising electronically storing a repository of candidate assessment templates and receiving an identification of a selected assessment template for creating the selected assessment.

3. The method of claim 1, further comprising calculating a graph similarity distance between at least one of the recorded decisions made by the first user candidate and at least one of the recorded decisions made by the second user candidate.

4. The method of claim 1, further comprising:

receiving an identification of the first user candidate as a benchmark candidate;

receiving a selection of a set of profile characteristics associated with the identified benchmark candidate;

receiving an identification of a range for values of the selected profile characteristics, the range defining a percentage deviation above and below the values of the characteristics associated with the identified benchmark candidate; and identifying one or more user candidates having associated profile characteristics within the defined percentage deviation from the identified benchmark candidate for all of the selected profile characteristics.

5. The method of claim 1, further comprising:

receiving an identification of the first user candidate as a benchmark candidate, wherein the benchmark candidate is associated with one or more profile characteristics;

receiving an identification of a range for values of the profile characteristics, the range defining a percentage deviation above for a years of experience profile characteristic, below for a volatility profile characteristic, and below for a cost profile characteristic with respect to the values of those characteristics associated with benchmark candidate;

identifying one or more user candidates having associated profile characteristics within the defined percentage deviation from the benchmark candidate for years of experience, volatility, and cost profile characteristics.

6. The method of claim 1, further comprising:

receiving an identification of the first user candidate as a benchmark candidate, wherein the benchmark candidate is associated with one or more profile characteristics;

receiving an identification of a range for values of the profile characteristics, the range defining a percentage deviation above and below the values of the characteristics associated with the benchmark candidate; and identifying one or more user candidates having both:

associated profile characteristics within the defined percentage deviation from the benchmark candidate; and a specified graph similarity distance between at least one of the recorded decisions made by the first user candidate and at least one of the recorded decisions made by the second user candidate.

7. The method of claim 1, further comprising:

receiving an identification of the first user candidate as a benchmark candidate;

assigning a characteristic of the benchmark candidate as the zero value on a graphical plot; and graphically displaying one or more candidate profile characteristics associated with a user candidate relative to the zero value of the benchmark candidate.

8. The method of claim 7, wherein the candidate profile characteristics comprise characteristics selected from candidate years of experience, salary, and volatility.

9. The method of claim 7, further comprising:

receiving an identification of a range for values of the profile characteristics, the range defining a percentage deviation above and below the values of the characteristics associated with the benchmark candidate; and displaying a graphical table comprising the user candidates having associated characteristics within the defined percentage deviation from the benchmark candidate.

10. The method of claim 1, further comprising:

calculating by a processor device:

a final comparison between at least one of the recorded decisions made by the first user candidate and at least one of the recorded decisions made by the second user candidate, the comparison based on a difference between a recorded final state of the first user candidate assessment and a recorded final state of a second user candidate assessment, the final states being the states of the user candidate assessments upon completion of the candidate assessments; and electronically storing the final comparison on the computerized data storage device.

11. The method of claim 1, wherein the one or more recorded intermediate states of the first user candidate assessment are represented as corresponding points in one or more decision trees.

12. The method of claim 1, further comprising:

using the processor module device to represent the first and second user candidate decisions as paths through one or more decision trees; and wherein the comparison based on the difference between the recorded intermediate states of the first user candidate assessment and the recorded intermediate states of the second user candidate assessment at corresponding points on the one or more decision trees.

13. The method of claim 1, wherein the recorded decisions made by the first and second user candidates are represented as points in one or more decision trees, and calculating a comparison based on decisions at corresponding intermediate points on the one or more decision trees.

14. The method of claim 1, wherein each of a plurality of the intermediate states of the first user candidate assessment and each of a plurality of the intermediate states of a second user candidate assessment are recorded at a predetermined time interval.

15. The method of claim 14, further comprising calculating a difference between one or more states based on the intermediate states recorded at the predetermined time interval.

16. The method of claim 1, wherein the candidate assessment workspaces are instantiated as at least one virtual machine or at least one means for collecting input from the user candidate at a remote location.

17. The method of claim 1, further comprising:

defining a plurality of the recorded decisions made by the first user candidate as a first user candidate solution;

defining a plurality of the recorded decisions made by the second user candidate as a second user candidate solution;

designating the first user candidate solution as a benchmark solution corresponding to a benchmark candidate;

calculating a distance between the benchmark solution and the second user candidate solution; and electronically storing the distance on the computerized data storage device.

18. The method of claim 1, wherein the first and second user candidate decisions are input to the candidate assessment workspaces by first and second candidates using a language defined by a selected domain grammar and wherein the candidate assessment workspaces are provisioned with software development tools for solving a problem with which the candidates have been presented.

19. A system for assessing the skills and capabilities of a candidate, the system comprising:

an electronic data store device configured for:

electronically storing a plurality of candidate assessments for assessing one or more user candidates in a computerized data storage device;

electronically recording decisions made by a first user candidate while the first user candidate is operating within a first candidate assessment workspace, wherein the decisions are represented by a plurality of states, including at least one intermediate state, the states representing a sequence of inputs into the first candidate assessment workspace;

electronically recording decisions made by a second user candidate while the second user candidate is operating within a second candidate assessment workspace, wherein the decisions are represented by a plurality of states, including at least one intermediate state, the states representing a sequence of inputs into the second candidate assessment workspace;

electronically storing an intermediate comparison on the electronic data storage device;

a processor module device configured for:

receiving an identification of a selected assessment from the computerized data storage device;

provisioning a first candidate assessment workspace including the selected assessment for administration to the first user candidate;

provisioning a second candidate assessment workspace including the selected assessment for administration to the second user candidate;

calculating by a processor device:

an intermediate comparison between at least one of the recorded decisions made by the first user candidate and at least one of the recorded decisions made by the second user candidate, the comparison based on a difference between the at least one recorded intermediate state of the first user candidate assessment and the at least one recorded intermediate state of the second user candidate assessment, the intermediate states being the results of intermediate decisions input by the first user candidate and the second user candidate while operating within the candidate assessment before the assessment is completed.

20. The system of claim 19, wherein the processor module device is further configured for:

receiving an identification of the first user candidate as a benchmark candidate, wherein the benchmark candidate is associated with one or more profile characteristics;

receiving an identification of a set of profile characteristics;

receiving an identification of a range for values of the identified profile characteristics, the range defining a percentage deviation above and below the values of the characteristics associated with benchmark candidate; and identifying one or more user candidates having associated profile characteristics within the defined percentage deviation from the benchmark candidate for all of the identified set of profile characteristics.

* * * * *